(12) United States Patent
Corby et al.

(10) Patent No.: US 7,752,106 B1
(45) Date of Patent: Jul. 6, 2010

(54) SYSTEM, METHOD, AND COMPUTER PROGRAM PRODUCT FOR PREDICTING A WEATHER-BASED FINANCIAL INDEX VALUE

(75) Inventors: Paul Mark Corby, Malvern, PA (US); Roberto Correa Machado, Jr., Wilmington, DE (US); Frederic D. Fox, Berwyn, PA (US)

(73) Assignee: Planalytics, Inc., Berwyn, PA (US)

( * ) Notice: Subject to any disclaimer, the term of this patent is extended or adjusted under 35 U.S.C. 154(b) by 956 days.

(21) Appl. No.: 11/183,907

(22) Filed: Jul. 19, 2005

(51) Int. Cl.
*G06Q 40/00* (2006.01)

(52) U.S. Cl. .................. 705/35; 705/36 R

(58) Field of Classification Search ............ None
See application file for complete search history.

(56) References Cited

U.S. PATENT DOCUMENTS

| | | |
|---|---|---|
| 3,808,410 A | 4/1974 | Schlesinger |
| 4,015,366 A | 4/1977 | Hall, III |
| 4,040,629 A | 8/1977 | Kelly |
| 4,218,755 A | 8/1980 | Root |
| 4,342,125 A | 8/1982 | Hodge |
| 4,580,814 A | 4/1986 | Berler |
| 4,626,992 A | 12/1986 | Greaves et al. |
| 4,642,775 A | 2/1987 | Cline et al. |
| 4,766,539 A | 8/1988 | Fox |
| 4,784,150 A | 11/1988 | Voorhies et al. |
| 5,063,506 A | 11/1991 | Brockwell et al. |
| 5,128,861 A | 7/1992 | Kagami et al. |
| 5,128,862 A | 7/1992 | Mueller et al. |
| 5,130,925 A | 7/1992 | Janes et al. |
| 5,140,523 A | 8/1992 | Frankel et al. |
| 5,168,445 A | 12/1992 | Kawashima et al. |

(Continued)

FOREIGN PATENT DOCUMENTS

CA  2 153976 C  7/1994

(Continued)

OTHER PUBLICATIONS

World's First Financial Weather Index Acquired by Weather Board of Trade, PR Newswire. New York: Apr. 16, 2002. p. 1.*

(Continued)

*Primary Examiner*—Alexander Kalinowski
*Assistant Examiner*—Gregory Johnson
(74) *Attorney, Agent, or Firm*—Sterne, Kessler, Goldstein & Fox, P.L.L.C.

(57) ABSTRACT

A weather-based financial index is based at least in part on weather. The index may take into account any of a variety of weather factors, such as temperature, precipitation, humidity, number of sunny or overcast days in a period of time, number of freeze days in a period of time, etc. Weather factor value(s) are combined with one or more financial components to provide the weather-based financial index. The index may be traded on an exchange, such as the New York Mercantile Exchange (NYMEX). The value of the index may be calculated based on any period or on any geography (or combination of geographies). Historical values of the index or component(s) thereof may be used to predict future values of the index. Values of the index may provide insight into the direction of a component of the index, a market or industry corresponding to the component, or the index itself.

58 Claims, 8 Drawing Sheets

U.S. PATENT DOCUMENTS

| | | | |
|---|---|---|---|
| 5,189,606 A | 2/1993 | Burns et al. | |
| 5,208,665 A | 5/1993 | McCalley et al. | |
| 5,237,496 A | 8/1993 | Kagami et al. | |
| 5,250,941 A | 10/1993 | McGregor et al. | |
| 5,253,165 A | 10/1993 | Leiseca et al. | |
| 5,253,181 A | 10/1993 | Marui et al. | |
| 5,263,167 A | 11/1993 | Conner, Jr. et al. | |
| 5,283,865 A | 2/1994 | Johnson | |
| 5,295,064 A | 3/1994 | Malec et al. | |
| 5,295,069 A | 3/1994 | Hersey et al. | |
| 5,309,355 A | 5/1994 | Lockwood | |
| 5,342,144 A | 8/1994 | McCarthy | |
| 5,377,095 A | 12/1994 | Maeda et al. | |
| 5,444,820 A | 8/1995 | Tzes et al. | |
| 5,491,629 A | 2/1996 | Fox et al. | |
| 5,504,675 A | 4/1996 | Cragun et al. | |
| 5,521,813 A | 5/1996 | Fox et al. | |
| 5,654,886 A | 8/1997 | Zereski, Jr. et al. | |
| 5,673,366 A | 9/1997 | Maynard et al. | |
| 5,692,233 A | 11/1997 | Garman | |
| 5,712,985 A | 1/1998 | Lee et al. | |
| 5,740,549 A | 4/1998 | Reilly et al. | |
| 5,753,784 A | 5/1998 | Fischer et al. | |
| 5,768,586 A | 6/1998 | Zweben et al. | |
| 5,787,283 A | 7/1998 | Chin et al. | |
| 5,796,611 A | 8/1998 | Ochiai et al. | |
| 5,796,932 A | 8/1998 | Fox et al. | |
| 5,832,456 A | 11/1998 | Fox et al. | |
| 5,848,378 A | 12/1998 | Shelton et al. | |
| 5,855,006 A | 12/1998 | Huemoeller et al. | |
| 5,870,302 A | 2/1999 | Oliver | |
| 5,884,286 A | 3/1999 | Daughtery, III | |
| 5,909,671 A | 6/1999 | Byford et al. | |
| 5,946,662 A | 8/1999 | Ettl et al. | |
| 5,974,395 A | 10/1999 | Bellini et al. | |
| 5,978,738 A | 11/1999 | Brown | |
| 5,979,363 A | 11/1999 | Shaar | |
| 5,983,200 A | 11/1999 | Slotznick | |
| 5,999,882 A | 12/1999 | Simpson et al. | |
| 6,002,863 A | 12/1999 | Sheer et al. | |
| 6,009,407 A | 12/1999 | Garg | |
| 6,012,834 A | 1/2000 | Dueck et al. | |
| 6,014,606 A | 1/2000 | Tu | |
| 6,018,317 A | 1/2000 | Dogan et al. | |
| 6,018,640 A | 1/2000 | Blackman et al. | |
| 6,021,402 A | 2/2000 | Takriti | |
| 6,035,285 A | 3/2000 | Schlect et al. | |
| 6,061,662 A | 5/2000 | Makivic | |
| 6,067,525 A | 5/2000 | Johnson et al. | |
| 6,078,901 A | 6/2000 | Ching | |
| 6,104,582 A | 8/2000 | Cannon et al. | |
| 6,108,662 A | 8/2000 | Hoskins et al. | |
| 6,144,944 A | 11/2000 | Kurtzman et al. | |
| 6,151,582 A | 11/2000 | Huang et al. | |
| 6,173,276 B1 | 1/2001 | Kant et al. | |
| 6,188,960 B1 | 2/2001 | Baron et al. | |
| 6,216,109 B1 | 4/2001 | Zweben et al. | |
| 6,240,369 B1 | 5/2001 | Foust | |
| 6,263,321 B1 | 7/2001 | Daughtery, III | |
| 6,298,285 B1 | 10/2001 | Addink et al. | |
| 6,298,307 B1 | 10/2001 | Murphy et al. | |
| 6,317,686 B1 | 11/2001 | Ran | |
| 6,321,212 B1 | 11/2001 | Lange | |
| 6,339,747 B1 | 1/2002 | Daly et al. | |
| 6,341,287 B1 | 1/2002 | Sziklai et al. | |
| 6,356,842 B1 | 3/2002 | Intriligator et al. | |
| 6,397,162 B1 | 5/2002 | Ton | |
| 6,405,134 B1 | 6/2002 | Smith et al. | |
| 6,405,179 B1 | 6/2002 | Rebane | |
| 6,418,417 B1 | 7/2002 | Corby et al. | |
| 6,453,215 B1 | 9/2002 | Lavoie | |
| 6,453,216 B1 | 9/2002 | McCabe et al. | |
| 6,473,084 B1 | 10/2002 | Phillips et al. | |
| 6,496,780 B1 | 12/2002 | Harris et al. | |
| 6,498,987 B1 | 12/2002 | Kelly et al. | |
| 6,505,123 B1 | 1/2003 | Root et al. | |
| 6,535,817 B1 | 3/2003 | Krishnamurti | |
| 6,581,008 B2 | 6/2003 | Intriligator et al. | |
| 6,584,447 B1 | 6/2003 | Fox et al. | |
| 6,591,255 B1 | 7/2003 | Tatum et al. | |
| 6,654,689 B1 | 11/2003 | Kelly et al. | |
| 6,753,784 B1 | 6/2004 | Sznaider et al. | |
| 6,985,837 B2 | 1/2006 | Moon et al. | |
| 7,031,927 B1 | 4/2006 | Beck et al. | |
| 7,069,232 B1 | 6/2006 | Fox et al. | |
| 7,080,018 B1 | 7/2006 | Fox et al. | |
| 7,103,560 B1 | 9/2006 | Fox et al. | |
| 7,130,789 B2 * | 10/2006 | Glodjo et al. | 705/37 |
| 7,162,444 B1 | 1/2007 | Machado, Jr. et al. | |
| 7,184,965 B2 | 2/2007 | Fox et al. | |
| 7,184,983 B2 | 2/2007 | Corby et al. | |
| 2002/0026284 A1 | 2/2002 | Brown | |
| 2002/0032644 A1 | 3/2002 | Corby et al. | |
| 2002/0038217 A1 | 3/2002 | Young | |
| 2002/0062594 A1 * | 5/2002 | Erickson | 705/1 |
| 2002/0084900 A1 | 7/2002 | Peterson et al. | |
| 2002/0091692 A1 | 7/2002 | Yoshida et al. | |
| 2002/0099640 A1 | 7/2002 | Lange | |
| 2002/0107638 A1 | 8/2002 | Intriligator et al. | |
| 2002/0130899 A1 | 9/2002 | Ryan et al. | |
| 2002/0133385 A1 | 9/2002 | Fox et al. | |
| 2002/0178077 A1 | 11/2002 | Katz et al. | |
| 2002/0184126 A1 | 12/2002 | McIntyre et al. | |
| 2002/0194099 A1 * | 12/2002 | Weiss | 705/36 |
| 2002/0194113 A1 | 12/2002 | Lof et al. | |
| 2002/0194148 A1 | 12/2002 | Billet et al. | |
| 2003/0004780 A1 | 1/2003 | Smith et al. | |
| 2003/0107490 A1 | 6/2003 | Sznaider et al. | |
| 2003/0126155 A1 | 7/2003 | Parker et al. | |
| 2003/0130883 A1 | 7/2003 | Schroeder et al. | |
| 2003/0200027 A1 | 10/2003 | Root et al. | |
| 2004/0093296 A1 | 5/2004 | Phelan et al. | |
| 2004/0215394 A1 | 10/2004 | Carpenter et al. | |
| 2004/0225556 A1 | 11/2004 | Willen et al. | |
| 2004/0230519 A1 * | 11/2004 | Parker | 705/37 |
| 2005/0021435 A1 * | 1/2005 | Hakanoglu et al. | 705/36 |
| 2005/0096947 A1 | 5/2005 | Fox et al. | |
| 2005/0108150 A1 | 5/2005 | Pethick et al. | |
| 2005/0119962 A1 | 6/2005 | Bowen et al. | |
| 2005/0154531 A1 | 7/2005 | Kelly et al. | |
| 2005/0177411 A1 | 8/2005 | Schuhn | |
| 2005/0216384 A1 * | 9/2005 | Partlow et al. | 705/35 |
| 2006/0247996 A1 * | 11/2006 | Feldman | 705/35 |
| 2006/0271461 A1 * | 11/2006 | Chorna et al. | 705/35 |
| 2006/0293980 A1 | 12/2006 | Corby et al. | |

FOREIGN PATENT DOCUMENTS

| | | |
|---|---|---|
| DE | 41 14 584 | 11/1991 |
| FR | 2 751 774 | 7/1996 |
| FR | 2 732 477 | 10/1996 |
| JP | 4-135271 | 5/1992 |
| JP | 9-128411 | 5/1997 |
| JP | 10-96790 | 4/1998 |
| JP | 10-332840 | 12/1998 |
| JP | 11-258359 | 9/1999 |
| WO | WO 94/16394 | 7/1994 |
| WO | WO 98/22899 | 5/1998 |
| WO | WO 2007/002454 | 1/2007 |

OTHER PUBLICATIONS

World's First Financial Weather Index Acquired by Weather Board of Trade, PR Newswire. New York: Apr. 16, 2002. p. 1.*

Carl G. Anderson, "Complex Market Policy Mix Indicates Volatile Prices", vol. 12, No. 8 May 16, 2005, p. 1-2.*
Carl G. Anderson, "Complex Market Policy Mix Indicates Volatile Prices", vol. 12, No. 8 May 16, 2005, Graph, p. 1.*
World's First Financial Weather Index Acquired by Weather Board of Trade, PR Newswire. New York: Apr. 16, 2002. p. 1.*
Carl G. Anderson, "Complex Market Policy Mix Indicates Volatile Prices", vol. 12, No. 8 May 16, 2005, p. 1-2.*
Carl G. Anderson, "Complex Market Policy Mix Indicates Volatile Prices", vol. 12, No. 8 May 16, 2005, Graph, pg. 1.*
Weather Derivatives and Weather Risk Management, Patrick L Brockett; Mulong Wang; Chuanhou Yang, Risk Management and Insurance Review; Spring 2005; 8, 1; 14 pgs.*
Temperature, price and profit: Managing weather risk, Roxane Richter. Public Utilities Fortnightly. Arlington: Sep. 1, 1998. vol. 136, Iss. 16; p. 40, 6 pgs.*
Zipspeed Launches World's First Financially Traded Weather Index, PR Newswire , p. ATM01825032002, Mar. 25, 2002 2 pgs.*
Weather Hedging, Energy User News , v 26 , n 5 , May 2001, 6 pgs.*
Ex parte Bilski, No. 2002-2257, 2006 Pat. App. LEXIS 51, at *1 n.1 (B.P.A.I. Sep. 26, 2006).
In re Bilski, No. 2007-1130 (Fed. Cir. Feb. 15, 2008).
Carl G. Anderson, "Complex Market Policy Mix Indicates Volatile Prices", vol. 12, No. 8, May 16, 2005, pp. 1 and 2.
Carl G. Anderson, "Complex Market Policy Mix Indicates Volatile Prices", vol. 12, No. 8, May 16, 2005, Graph, p. 1.
http://www.irrigation.com—as Archived on Feb. 19, 1999.—A trade web site on golf, agriculture and landscape irrigation.
Helfrich, Greg; Haas, Greg; Dubin Gary, "Software developed for disinfection rule compliance", Water Engineering & Management, 1993.
Erickson, Paul, "Determination of Minimum Pool Level for Quabbin Reservoir on the Basis of Water Quality Constraints", 1966.
Price et al. "Adapting a Patch Model to Simulate the Sensitivity of Central-Canadian Boreal Ecosystems to Climate Variability." Journal of Biogeography, vol. 26, No. 5, pp. 1101-1113, Sep. 1999.
Reynolds, C.S. "The Ecosystems Approach to Water Management" (abstract only). Journal of Aquatic Ecosystem Stress and Recovery, vol. 2, No. 1, Mar. 1993.
Risser, Paul G. "The Status of the Science Examining Ecotones." BioScience, vol. 45, No. 5, p. 318(8), May 1995.
Kickert et al. "Predictive Modeling of Effects Under Global Change." Environmental Pollution 100 (103), pp. 87-132, 1999.
International Search Report issued Jan. 8, 2001 for PCT/US01/11915, 4 pages.
Banham, R., "Reinsurers Seek Relief in Computer Predictions", Aug. 1993, pp. 14-16, 18-19, XP002082269, p. 14, col. 1, line 1, col. 2, line 29.
Gagne, James, 'Fair-weather trends', May 1997, American Demographics, pp. 1-5.
Gotschall, Mary G., "Bullish on weather," *Electric Perspectives*, Washington, vol. 23, No. 5, p. 30, 8 pgs (Sep./Oct. 1998). http://www.bysb.com/sponsors/weathr.htm.
Hunter, R., "Forecast for Weather Derivatives: Hot Derivatives Strategy," May 1999, pp. 1-6, XP002133864, as printed from http://derivatives.com/magazine/arrive/1998/0598feal.asp>p. 1, line 1—p. 6, line 9.
"Japan-US Business Report, American Companies in Japan," *Software and Information Services*, vol. 1997, No. 335, Aug. 31, 1997.
Karmin, Monroe W., "Inflation, Jobs and Interest Rates: Dangerous Territory," *U.S. News & World Report*, vol. 108, No. 19., p. 50, May 14, 1990.
Lucchetti, A., "Cold Winter on the Way? Some bet on it," Wall Street Journal, Nov. 6, 1997.
Malliaris, M., "Beating the Best: A Neutral Network Challenges the Black-Scholes Formula," *Proceedings of the Conference on Artificial Intelligence for Applications*, US, Los Alamitos, IEEE Comp. Soc. Press, 1993, pp. 445-449, XP000379639, ISBN; 0/8186-3840-0, p. 445, col., 1, line 16, p. 446, col. 1, line 17.
"Microsoft Expedia Travel Services Debuts on the Web," PR Newswire, Oct. 22, 1996.
Ojala, Marydee, "The dollar sign: Weather databases online," Database, vol. 18, No. 1, pp. 72-76, Feb./Mar. 1995.

"Origins of Option Pricing Techniques", "The Black and Scholes Model", "The Black and Scholes Model" and "Graphs of the Black Scholes Model", as printed from http://bradley.bradley.edu/.about.arr/bsm, Apr. 9, 1997, (8 pages).
Pizano, A. et al., "Automatic Generation of Graphical User Interfaces for Interactive Database Applicaitons," *Proceedings of the 1993 International Conference on Information and Knowledge Management*, Association for Computing Machinery, pp. 344-355 (Nov. 1993), XP009035258.
Rao, S.R.;Thomas, Edward G; Javalgi, Rajshekhar G., 'Activity Preferences and Trip-Planning Behavior of the U.S. Outbound Pleasure Travel Market', Winter, 1992, Journal of Travel Research, pp. 1-12.
Schwartz, S., "Modeling tools aid in financial risk management," *Insurance & Technology*, vol. 21, No. 4, pp. 20-21 (Apr. 1996).
"Skyline Multimedia Entertainment, Inc. Announces Co-Marketing Pact With Internet's InfoSpace.com; Deal Marks Theme Entertainment Company's Expansion Into Tour Industry Services," Business Wire, Sep. 4, 1998.
Stix, G., "A Calculus of Risk," *Scientific American*, pp. 92-97 (May 1998).
Studwell, A., "Weather Derivatives," $11^{th}$ Conference on Applied Climatology, Jan. 10-15, 1999, pp. 36-40, XP00089822, p. 36, col. 1, line 1-p. 40, col. 1, line 33.
Turvey, Calum G., "Weather Derivatives and Specific Event Risk," *Proceedings of the 1999 American Agricultural Economics Association Annual Meeting*, American Agricultural Economics Association (Aug. 1999).
Turvey, Calum, "Weather Derivatives for Specific Event Risks in Agriculture," *Review of Agricultural Economics*, American Agricultural Economics Association, vol. 23, No. 2, pp. 333-351 (Spring/Summer 2001).
Upbin, B., "Betting against God," *Forbes*, vol. 162, No. 1, p. 108(1) (Jul. 6, 1998).
'Urilicorp's Aquila energy to Greatly Expand it's Weather Hedging Products', Nov. 20, 1997, McGraw-Hill Publications, vol. 17, No. 1, p. 4.
"WeatherPlanner Introduces Weather Forecasting Service for Consumers and Small Businesses," PR Newswire, Nov. 11, 1997.
"WeatherPlanner Introduces Weather Forecasting Service for Skiers; Revolutionary Planning Tool Provides Forecasts up to 12 Months in Advance," PR Newswire, Dec. 12, 1997.
"WeatherPlanner Introduces Weather Forecasting Service for Vacationers; Revolutionary Planning Tool Provides Forecasts up to 12 Months in Advance," PR Newswire, Mar. 19, 1998.
"WeatherPlanner Introduces Weather Forecasting Service to Aid Brides in Planning Weddings and Honeymoons," PR Newswire, Dec. 9, 1997.
"WeatherPlanner Offers Weather Forecasting Service for Outdoor Enthusiasts; Weather Forecasts Now Available up to 12 Months in Advance," PR Newswire, Mar. 6, 1998.
"WeatherPlanner Tees Up Weather Forecasting Service for Golfers; Weather Forecasts Now Available up to 12 Months in Advance," PR Newswire, May 5, 1998.
"Web WeatherPlanner Site for Weather Predictions," Newsbytes News Network, Dec. 12, 1997.
Williams, Michael et al., "Natural Gas Trends," Railroad Commission of Texas Gas Services Division Regulatory Analysis & Policy Section, Jul. 28, 2003.
www.intellicast.com, Screen Print, Jul. 4, 1998.
wysiwyg://171/http://www.aquilaenergy.com/northamerica/about/.
English Abstract of French Patent Publication No. 2 751 774, 1 page, data supplied from the esp@cenet database.
English Abstract of Japanese Patent Publication No. 9-128411, 1 page, data supplied from the esp@cenet database.
English Abstract Page for Japanese Patent Publication No. 10332840, 1 page, data supplied from the esp@cenet database.
International Search Report from PCT Appl. No. PCT/US93/11005, 6 pages, mailed Jun. 27, 1994.
International Search Report from PCT Appl. No. PCT/US95/00618, 5 pages, mailed May 3, 1995.
International Search Report from PCT Appl. No. PCT/US95/02557, 4 pages, mailed Jun. 8, 1995.

International Search Report from PCT Appl. No. PCT/US97/01075, 5 pages, mailed May 14, 1997.
International Search Report from PCT Appl. No. PCT/US99/23452, 5 pages, mailed Jun. 4, 2000.
International Search Report from PCT Appl. No. PCT/US04/32440, 3 pages, mailed May 27, 2005.
Best, D.L. and Pryor, S.P., *Air Weather Service Model Output Statistics System Project Report*, United States Air Force, Entire Report submitted (Oct. 1983).
*Demand Modeling & Forecasting System Product Description*, Printed from Dialog File No. 256, 1 page (Apr. 1989—Product Release Data).
*Down to Earth Sales Analysis 3.1 Product Description*, Printed from Dialog File No. 256, 1 page (Apr. 1989—Product Release Date).
Hurrell, M., "The Weather Business," *Intercity*, pp. 29, 31 and 32 (Feb. 1991).
*IMREX Demand Forecasting System Product Description*, Printed from Dialog File No. 256, 1 page (1984—Product Release Date).
*The Weather Initiative*, (Brochure), The Met Office, 23 pages (1990).
*Microsoft Excel User's Guide*, Microsoft Corporation, pp. 280-281, 596-601 and 706-709 (1993).
Brennan Peter J., "Portfolio Managers Weather Global Risk Management Challenge," *Wall Street Computer Review*, Dealers Digest Inc., vol. 7, No. 1, pp. 20-22, 24, 54, 56, Oct. 1989.
Jensen, Cary and Anderson, Loy, *Harvard Graphics: The Complete Reference*, Osborne McGraw-Hill, pp. 5, 16, 17, 126-129, 737-747, 1990.
Cave, Tom, "Weather Service Is a Boon To System Dispatchers," *Transmission & Distribution*, vol. 43, No. 8, pp. 165, 166, 168-169, Aug. 1991.
Mitchell et al., "Where No Computer Has Gone Before: Massively Parallel Processing Promises Unparalleled Performance," McGraw-Hill Inc., *Business Week*, pp. 80-84, 88, Nov. 25, 1991.
Engle, R.F. et al, "Modelling Peak Electricity Demand," John Wiley & Sons, Ltd., *Journal of Forecasting*, vol. 11, No. 3, pp. 241-251, Apr. 1992.
*Microsoft Access™ User's Guide*, Microsoft Corporation, pp. 22-27, 36-39, 327-335, 370-373, 395-447, 1992.
Ehrenberg, A.S.C. et al., "The After Effects of Price-Related Consumer Promotions," Advertising Research Foundation, Inc., *Journal of Advertising Research*, vol. 34, No. 4, pp. 11-12, Jul./Aug. 1994.
Patent Abstracts of Japan, JP 1236396, published Sep. 21, 1989.
Patent Abstracts of Japan, JP 1259488, published Oct. 17, 1989.
Patent Abstracts of Japan, JP 2268396, published Nov. 2, 1990.
Patent Abstracts of Japan, JP 2299059, published Dec. 11, 1990.
Patent Abstracts of Japan, JP 4077896, published Mar. 11, 1992.
Patent Abstracts of Japan, JP 4135271, published May 8, 1992.
Patent Abstracts of Japan, JP 4353970, published Dec. 8, 1992.
Patent Abstracts of Japan, JP 5189406, published Jul. 30, 1993.
Patent Abstracts of Japan, JP 6076161, published Mar. 18, 1994.
Patent Abstracts of Japan, JP 6149833, published May 31, 1994.
"SpaceRef.com", Space Shuttle Weather Launch Commit Criteria and KSC End of Mission Weather Landing Criteria, Jan. 29, 2000; 9 pages.
Chen, P.C., "Supercomputer-Based Visualization Systems Used for Analyzing Output Data of a Numerical Weather Prediction Model," ACM, pp. 296-309 (1990).
Riordan, D. and Hansen, B.K., "A fuzzy case-based system for weather prediction," *Engineering Intelligent Systems*, vol. 10, No. 3, CRL Publishing Ltd., pp. 139-146 (Sep. 2002).
English Abstract Page for Japanese Patent Publication No. 10096790, 1 page, data supplied from the esp@cenet database.
English Abstract Page for Japanese Patent Publication No. 11258359, 1 page, data supplied from the esp@cenet database.
Fox, Frederic, Weather—The next retail frontier, Discount Merchandiser, Oct. 1993, vol. 33, No. 10.
Robins, Gary, Tracking sales climate, Stores, Nov. 1993, vol. 75, No. 11, pp. 52-54.
Vogelstein, Fred, Corporate America loves the weather: why companies pay for next years forecast, U.S. News & World Report, Apr. 13, 1998, vol. 124, No. 14.
Cawthorn, Chris, Weather as a strategic element in demand chain planning, Journal of Business Forecasting Methods & Systems, Fall 1998, vol. 17, No. 3.
Baker, Stacy, Only the weatherman knows (but so can you), Apparel Industry Magazine, Jun. 1999, vol. 60, No. 6, pp. 16-18.
Planalytics Introduces Three Planning Products at Retail Systems 2001, PR Newswire, Jun. 5, 2001.
Demantra, Planalytics Offer Joint Solution, Business Wire, Aug. 20, 2001.
Taming Weather's Unpredictable Impact, Retail Merchandiser, Apr. 2002, vol. 42, No. 4.
Retailers use sales forecasts to get in front of the weather, National Home Center News, Nov. 20, 2000, vol. 26, No. 21, p. 8.
Leung, K.S. et al., Fuzzy Concepts in Expert Systems, IEEE, Sep. 1988.
Prior, John, Weather Intelligence: the new secret service, Food Manufacture, vol. 69, No. 5, May 1994.
Cawthorn, Chris, Weather As a Strategic Element in Demand Chain Planning, The Journal of Business Forecasting Methods & Systems, vol. 17, No. 3, Fall 1998.
Shutovich, Christina, When it rains, wipers pour profits: Retailers need to prepare for customers during a downpour, Aftermarket Business, vol. 109, No. 12, Dec. 1999.
Cawthorn, Christopher, Sunny today, sales tomorrow—clothing industry, Bobbin, May 1999.
McNeeley, Trent, High-tech weather service aids business planning, TechRepublic.com, Jan. 20, 2000.
Vilano, Matt, A Smile Makes a Lousy Umbrella, CIO Magazine, Mar. 15, 2000.
Impact SR from Planalytics Gives Retailers New Weapon Against Weather, PR NewsWire, Sep. 14, 2000.
Taming Weather's Unpredictable Impact, Retail Merchandiser, vol. 42, No. 4, Apr. 2002.
Weather for sale, Daily Record, Jun. 22, 2002.
Corby, Paul M., Weather volatility and power demand, Power Economics, vol. 6, No. 7, Jul./Aug. 2002.
SmartCorp.com Web Pages, Smart Software, Inc., May 2000-Jul. 2001, Retrieved from Archive.org, Dec. 20, 2005.
Lucas, Peter, Certainty-Factor-Like Structures in Bayesian Networks, Advances in Artificial Intelligence, AI*IA99, 1999.
Makridakis, Spyros et al., Forecasting Methods and Applications-Third Edition, John Wiley & Sons, 1998, ISBN: 0-471-53233-9.
Shim, Jae K., Strategic Business Forecasting—Revised Edition, CRC Press, 2000, ISBN: 1-57444251-1.
American Academy of Actuaries Index Securitization Task Force With Research and Input From Casualty Actuarial Society. Valuation, Finance and Investments Committee, "Evaluating the Effectiveness of Index-Based Insurance Derivatives in Hedging Property/Casualty Insurance Transactions," American Academy of Actuaries, Oct. 4, 1999, as printed at http://www.casact.org/research/istf/istf.pdf.
Zeng, L., "Pricing Weather Derivatives," *Journal of Risk Finance*, Spring 2000, as printed at http://www.atmos.washington.edu/~lixin/Zeng2000.pdf, pp. 72-78.
International Search Report issued Sep. 14, 2007 for PCT/US06/24563, 8 pages.

* cited by examiner

| Period | Geo | Weather Factor | Sub 1 | Sub 2 | Sub 3 | Sub 4 | Sub 5 | Sub 6 |
|---|---|---|---|---|---|---|---|---|
| 1994 | MSA 100 | TEMP.SEA | 46 | 47 | 50 | 51 | 54 | 55 |
| 1995 | MSA 100 | TEMP.SEA | 46 | 47 | 49 | 51 | 53 | 55 |
| 1994 | MSA 100 | SNOW.SEA | 0.7 | 0.2 | 0.2 | 0.1 | 0 | 0.1 |
| 1995 | MSA 100 | SNOW.SEA | 0.8 | 0.2 | 0.2 | 0.1 | 0 | 0 |
| 1994 | MSA 100 | PREC.SEA | 1.01 | 1.03 | 1.08 | 1.1 | 1.12 | 1.1 |
| 1995 | MSA 100 | PREC.SEA | 1.01 | 1.03 | 1.07 | 1.1 | 1.12 | 1.1 |
| 1994 | MSA 100 | SNOW | 0 | 0 | 0 | 0 | 0 | 0 |
| 1995 | MSA 100 | SNOW | 0 | 0.4 | 0.9 | 1.3 | 1.7 | 0.3 |
| 1994 | MSA 100 | PREC | 1.5 | 0.01 | 2.68 | 1.78 | 0.48 | 0.01 |
| 1995 | MSA 100 | PREC | 1.1 | 43 | 45 | 47 | 50 | 42 |
| 1994 | MSA 100 | TEMP | 49 | 51 | 56 | 50 | 58 | 54 |
| 1995 | MSA 100 | TEMP | 53 | −1 | −1 | −1 | −1 | −1 |
| 1994 | MSA 100 | TEMP.CAT | −1 | −1 | −1 | 0 | −1 | −1 |
| 1995 | MSA 100 | TEMP.CAT | −1 | −1 | −1 | −1 | −1 | −1 |
| 1994 | MSA 100 | PREC.CAT | −1 | −1 | −1 | −1 | −1 | −1 |
| 1995 | MSA 100 | PREC.CAT | 1 | −1 | −1 | 1 | −1 | −1 |

FIG. 2

| Date | Jan-95 | | | Feb-95 | | | ... | Dec-95 | | |
|---|---|---|---|---|---|---|---|---|---|---|
| | High | Low | Close | High | Low | Close | | High | Low | Close |
| 12/1/1994 | 1.720 | 1.650 | 1.653 | 1.760 | 1.690 | 1.694 | | 1.975 | 1.944 | 1.939 |
| 12/2/1994 | 1.690 | 1.620 | 1.635 | 1.730 | 1.660 | 1.678 | | 1.965 | 1.950 | 1.943 |
| 12/5/1994 | 1.735 | 1.620 | 1.728 | 1.745 | 1.670 | 1.744 | | 1.980 | 1.960 | 1.980 |
| 12/6/1994 | 1.768 | 1.680 | 1.691 | 1.775 | 1.705 | 1.715 | | 1.995 | 1.975 | 1.979 |
| 12/7/1994 | 1.790 | 1.666 | 1.784 | 1.800 | 1.711 | 1.794 | | 2.045 | 1.985 | 2.050 |
| 12/8/1994 | 1.865 | 1.756 | 1.847 | 1.870 | 1.790 | 1.861 | | 2.070 | 2.050 | 2.051 |
| 12/9/1994 | 1.890 | 1.805 | 1.842 | 1.895 | 1.830 | 1.867 | | 2.055 | 2.020 | 2.041 |
| 12/12/1994 | 1.940 | 1.870 | 1.913 | 1.960 | 1.880 | 1.924 | | 2.050 | 2.030 | 2.028 |
| 12/13/1994 | 1.920 | 1.765 | 1.768 | 1.930 | 1.824 | 1.824 | | 2.008 | 1.958 | 1.959 |
| 12/14/1994 | 1.770 | 1.690 | 1.714 | 1.800 | 1.710 | 1.728 | | 1.965 | 1.955 | 1.957 |
| 12/15/1994 | 1.740 | 1.680 | 1.718 | 1.740 | 1.700 | 1.721 | | 1.980 | 1.955 | 1.962 |

FIG. 3

| Period | Geo | Weather Factor | Sub 1 | Sub 2 | Sub 3 | Sub 4 | Sub 5 | Sub 6 |
|---|---|---|---|---|---|---|---|---|
| N+1 | MSA 100 | SNOW | 0.9 | 0.4 | 0.3 | 0.2 | 0 | 0 |
| N+1 | MSA 100 | PREC | 1.1 | 1.05 | 1.05 | 1.00 | 1.15 | 1.2 |
| N+1 | MSA 100 | TEMP | 48 | 49 | 50 | 53 | 55 | 57 |
| N+1 | MSA 100 | TEMP.CAT | 1 | 1 | 1 | 1 | 1 | -1 |
| N+1 | MSA 100 | PREC.CAT | 1 | 1 | -1 | -1 | -1 | -1 |
| N+1 | MSA 100 | SNOW.CAT | 1 | 0 | 0 | 1 | 0 | 0 |
| N+1 | MSA 100 | SNOW.SEA | 0.8 | 0.4 | 0.3 | 0.1 | 0 | 0 |
| N+1 | MSA 100 | PREC.SEA | 1.00 | 1.03 | 1.06 | 1.05 | 1.10 | 1.1 |
| N+1 | MSA 100 | TEMP.SEA | 47 | 47 | 49 | 52 | 54 | 55 |

FIG. 4

| Month | Days | Weather | Last | Change | Volatility | Component Values ||||| Recommend | Options |
|---|---|---|---|---|---|---|---|---|---|---|---|---|
| | | | | | | CL | NG | HO | HU | JM | | |
| Aug-05 | 12 | 72.80 | 5490.02 | -10.27 | 45% | $60.900 | $7.960 | $1.7430 | $1.7700 | $76.06 | BUY | $0.98 |
| Sep-05 | 35 | 64.80 | 4763.90 | -10.27 | 45% | $61.750 | $8.010 | $1.7660 | $1.7250 | $62.91 | SELL | $0.98 |
| Oct-05 | 56 | 53.50 | 3783.61 | 102.45 | 45% | $62.550 | $8.070 | $1.7875 | $1.6110 | $59.88 | SELL | $0.98 |
| Nov-05 | 77 | 43.40 | 2763.45 | -56.91 | 45% | $62.850 | $8.530 | $1.8070 | $1.6070 | $59.88 | BUY | $0.98 |
| Dec-05 | 97 | 34.00 | 2289.01 | -10.27 | 45% | $63.350 | $8.915 | $1.8460 | $1.6100 | $59.88 | SELL | $0.98 |
| Jan-06 | 118 | 28.20 | 1754.62 | -10.27 | 45% | $63.000 | $9.300 | $1.8740 | $1.5930 | $75.03 | BUY | $0.98 |
| Feb-06 | 137 | 30.90 | 1230.77 | -10.27 | 45% | $62.170 | $9.270 | $1.8750 | $1.6300 | $75.03 | BUY | $0.98 |
| Mar-06 | 158 | 38.80 | 1464.07 | -10.27 | 45% | $62.100 | $9.150 | $1.8600 | $1.6220 | $68.84 | SELL | $0.98 |
| Apr-06 | 180 | 48.70 | 1698.69 | -10.27 | 45% | $61.730 | $8.060 | $1.8250 | $1.7460 | $68.84 | BUY | $0.98 |
| May-06 | 199 | 59.40 | 1874.72 | -10.27 | 45% | $61.580 | $7.930 | $1.7870 | $1.7315 | $65.31 | BUY | $0.98 |
| Jun-06 | 221 | 68.70 | 2989.75 | -10.27 | 45% | $62.500 | $7.920 | $1.7155 | $1.7345 | $68.00 | BUY | $0.98 |
| Jul-06 | 243 | 74.40 | 4713.85 | -10.27 | 45% | $62.000 | $8.020 | $1.7205 | $1.7295 | $80.50 | SELL | $0.98 |

FIG. 7

SYSTEM, METHOD, AND COMPUTER PROGRAM PRODUCT FOR PREDICTING A WEATHER-BASED FINANCIAL INDEX VALUE

BACKGROUND OF THE INVENTION

1. Field of the Invention

The present invention relates generally to financial indexes, and more specifically, to a weather-based financial index.

2. Related Art

Weather provides risk in a financial marketplace. For example, weather may effect the price of a security, an equity, or a commodity. Several techniques have been introduced in an attempt to provide protection against weather-related risks. For example, weather futures may be traded on the Chicago Mercantile Exchange. In another example, over-the-counter derivatives, which are based on the average temperature over a predetermined time with respect to a reference temperature, may be traded as swaps or options. However, such risk management techniques generally do not provide liquidity and have been shunned by the financial markets.

What is needed is a method, system, and/or computer program product that addresses one or more of the aforementioned shortcomings of conventional weather-related risk management techniques.

SUMMARY OF THE INVENTION

A weather-based financial index is based at least in part on weather. The index may take into account any of a variety of weather factors, such as temperature, precipitation, humidity, number of sunny or overcast days in a period of time, number of freeze days in a period of time, etc. The weather-based financial index includes one or more financial components, each of which may be described as the price per reference unit of a commodity, an equity instrument, or an income instrument. Weather factor value(s) are combined with component(s) to provide the weather-based financial index. Components and/or weather factor values may be combined with respective weighting factors The weather-based financial index may be traded on an exchange, such as the New York Mercantile Exchange (NYMEX). The value of the index may be calculated based on any period, such as daily, weekly, monthly, yearly, etc. Historical values of the index may be used to predict future values of the index.

Values of the index may be used to provide insight into the direction of a component of the index, a market or industry corresponding to the component, or the index itself. For example, technical traders may use the index to determine trends or reversals in the corresponding market. Alternatively, the index may be used to hedge against risk that is inherent in the corresponding market. The index may be used by retailers, manufacturers, restaurants, industrial companies, utilities, etc. to help them better manage and hedge against financial risks due to the impact of weather on supply and/or demand. For example, weather may effect operational activities, commodity prices, debt instruments, corporate bonds, earnings guidance, stock values, dividends, etc.

A weather-based financial index value may be predicted in any of a variety of ways. For example, a historical financial component may be used to predict a future financial component. A value of a historical weather factor may be used to predict a value of a future weather factor. The future financial component and the future weather factor value may be combined, thereby predicting the weather-based financial index value.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 2 illustrates the weather history database of FIG. 1 according to an example embodiment of the present invention.

FIG. 3 illustrates the component database of FIG. 1 according to an example embodiment of the present invention.

FIG. 4 illustrates the weather forecast database of FIG. 1 according to an example embodiment of the present invention.

FIG. 7 is an example graphical user interface (GUI) that may be used by users of the weather-based index trading system shown in FIG. 1, according to an embodiment of the present invention.

Figure 1:
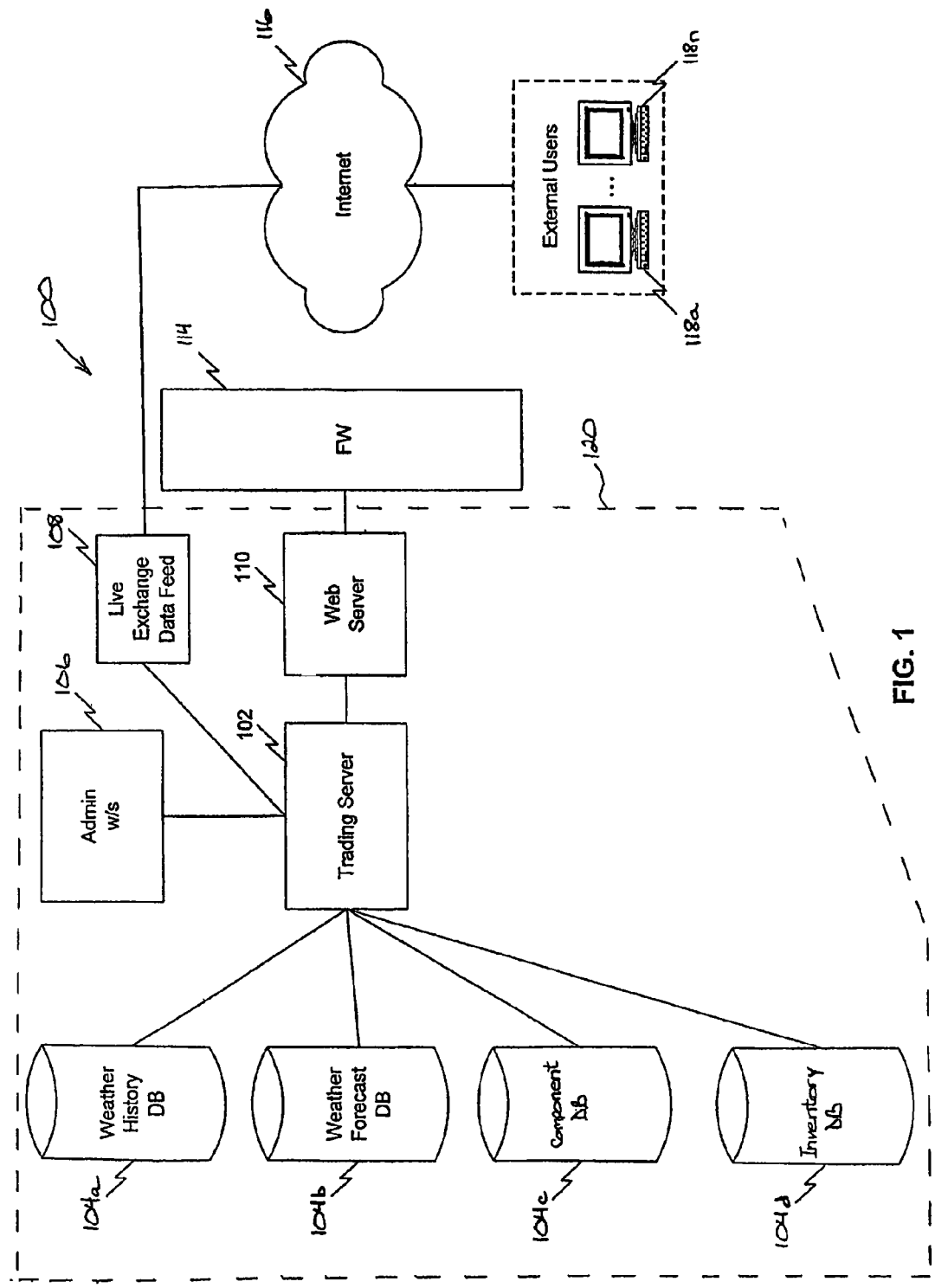
FIG. 1 is a block diagram of a weather-based index trading system according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Although the embodiments of the invention described herein refer specifically, and by way of example, to the energy, retail, and insurance markets, it will be readily apparent to persons skilled in the relevant art(s) that the invention is equally applicable to other markets, including but not limited to grains, metals, currencies, and any of a variety of other commodities, equity instruments, and/or income instruments. It will also be readily apparent to persons skilled in the relevant art(s) that the invention is applicable to any of a variety of exchanges, including but not limited to the Chicago Board of Trade, the Chicago Mercantile Exchange, the Commodity Exchange (COMEX), the New York Coffee Cocoa and Sugar Exchange, the New York Cotton Exchange (NYCE), the New York Futures Exchange (NYFE), the New York Mercantile Exchange (NYMEX), and the New York Stock Exchange (NYSE).

1.0 Introduction

An index provides a measure of change with reference to a base value. In the financial marketplace, an index may be used to measure a change in an economy, a market, or a part thereof, to provide some examples. An index includes one or more financial components. As discussed herein, a financial component is defined as the price per reference unit of a commodity, an equity instrument, or an income instrument. As used herein, the term "commodity" is defined to include without limitation bulk goods and resources capable of being traded, such as electricity. Example reference units include but are not limited to volume, weight, or the instrument itself. Reference units are represented using units of measure, such as gallon, barrel, ounce, ton, etc.

Financial components of an index may be combined in any of a variety of ways to determine the value of the index. For example, the financial components may be averaged together. In another example, the financial components may be given different weights, meaning that the financial components are multiplied by respective factors before being combined to determine the value of the index.

The Standard and Poor's 500 Index (S&P 500) is a widely used index that is calculated based on the market-weighted average of five-hundred U.S. stocks. "Market-weighted" means that the price of each stock is multiplied by a factor that is proportional to the market capitalization of that stock before the prices are combined to determine the value of the index. The price per share of each of the five-hundred stocks is a financial component of the S&P 500.

The Goldman Sachs Commodity Index (GSCI) is another widely used index, including financial components that represent different commodity sectors. The financial components of the GSCI are multiplied by respective weighting factors based on global production of the respective sectors.

The Morgan Stanley Retail Index (Chicago Board of Trade symbol MVR) is yet another index, which includes financial components that represent leading retail companies. The MVR may be traded on the Chicago Board of Options Exchange using options, for example. The MVR is equal-dollar-weighted to ensure that each of its component securities is represented in approximate equal dollar value. The MVR is intended to act as a tool for creating liquid institutional trading, hedging, and investment vehicles and to provide investors with an effective performance index for public retail companies. The options present investors with the tool to hedge holdings, participate in industry movement, and avoid risk involved in selecting specific stocks.

Other indexes include but are not limited to the Dow Jones MG Commodity Index (DJ-AIGCI), the Nasdaq Composite Index, the Russell 2000 Index, and the Value Line Index.

An index may be used for a variety of reasons. The index may be used to provide insight into the direction of a component of the index, a market or industry corresponding to the component, or the index itself. For example, technical traders may use the index to determine trends or reversals in the index, a component of the index, or a corresponding market or industry. Alternatively, the index may be used to hedge against risk that is inherent in the corresponding market or industry.

One risk that is often overlooked in the financial marketplace is weather. For example, none of the indexes discussed above take weather into account, though weather can substantially effect the financial markets. For instance, weather can effect consumer demand for products and services, commodities, and commodity prices. For retailer, manufacturers, restaurants, etc., weather can impact operational activities such as planning, production, allocation, assortment, replenishment, distribution, pricing, markdown management, inventory, and labor scheduling, to provide some examples. For industrial companies or utilities that purchase weather impacted commodities to run their plants for manufacturing or as a feed stock in the manufacturing of such end-products as PolyVinyl Chloride, Ammonia Fertilizer etc., weather can effect prices through its impact on supply and demand. Embodiments of the present invention address the need for a weather-based index.

2.0 Example Weather-Based Index Embodiments

Weather-based indexes are based at least in part on weather. A weather-based index may take into account any of a variety of weather factors, such as temperature, precipitation (e.g., rain, snow, hail, etc.), humidity, storm activity (e.g., hurricanes, tornadoes, floods, etc.), number of sunny or overcast days in a period of time, number of freeze days in a period of time, etc. A value of a weather factor may represent an average, median, high, low, or change in value, to provide some examples.

A weather-based index is generated by performing an algorithm (e.g., a mathematical algorithm) that incorporates weather-based factor(s). For example, the weather-based financial index may be generated by combining financial component(s) with the weather-based factor(s). In the example weather-based index embodiments described below, financial components are combined to provide a combination of components, and the combination is divided by at least one weather factor value to generate the index. The phrase "divide by" as used herein is defined to include mathematically equivalent operations, such as "multiply by the inverse of". It will be understood by persons skilled in the relevant art(s) that the operations used to generate the example indexes may be performed in any rational order. For example, each financial component may be divided by a weather factor value before being combined with other components.

The operations described below with reference to the example weather-based index embodiments are provided for illustrative purposes. The example weather-based index embodiments may use operations other than those described below. The example operations set forth below to describe the example indexes need not necessarily be used to generate the indexes. For example, component(s) of an index may be multiplied by a weather factor value, rather than divided by the weather factor value. The phrase "multiplied by" as used herein is defined to include mathematically equivalent operations, such as "divide by the inverse of". In another example, the value of the weather factor may be exponentially related to the value of the index. In embodiments, the weather-based financial index includes a single financial component. For example, the single financial component and a weather factor value may be combined to provide the weather-based financial index.

Several example weather-based indexes are described below. However, these examples are not intended to limit the scope of the present invention. Persons skilled in the relevant art(s) will recognize that the weather-based concepts described herein may be applied to and/or used to generate any of a variety of indexes.

2.1 Weather-Based Energy Index Embodiments

A weather-based energy index may include any of a variety of energy components. According to an embodiment of the present invention, the weather-based energy index includes any one or more of the energy commodities that may be traded on the New York Mercantile Exchange (NYMEX) or any other exchange, including but not limited to Brent crude oil, coal, electricity, heating oil, propane, light sweet crude oil, natural gas, and unleaded gasoline. The energy component(s) of the weather-based energy index are combined with weather factor value(s) to determine the value of the weather-based energy index. In embodiments, the energy component(s) are combined with respective stocks-to-use ratio(s), supply and/or demand variable(s), and/or weighting factor(s). According to embodiments, weather factor values may be combined with respective weighting factors.

In the example weather-based energy index embodiment described below, energy components are multiplied by respective weighting factors. The weighting factors are based on stocks-to-use ratios, supply variables, and/or demand variables of the respective energy components for illustrative purposes. Weighting factors need not necessarily be based on stocks-to-use ratios, supply variables, or demand variables. In fact, the weather-based energy index need not necessarily include weighting factors.

A stocks-to-use ratio (STU) provides a measure of the relationship between supply and demand for a commodity, for example. The supply and demand may be determined based on any period, including but not limited to a month, year, 2 years, 5 years, decade, etc. The STU may be represented mathematically by the following equation:

$$STU = \frac{A}{B}; \quad \text{(Equation 1)}$$

where A is the ending stock (representing supply) of the commodity for the period, and B is the total use (representing demand) of the commodity during the period.

Referring to Equation 1, the ending stock, A, may be represented by the following equation:

$$A = C + D - B; \quad \text{(Equation 2)}$$

where C is the beginning stock of the commodity for the period, and D is the total production of the commodity during the period. According to an embodiment, the beginning stock of the commodity represents the carryover from the previous period. For example, the beginning stock may be the amount of the commodity that is in inventory at the beginning of the period. The total production, D, represents the total amount of the commodity that is produced during the period. For example, the total production, D, may include the amount of the commodity that is imported during the period. In another example, the total use, B, may include the amount of the commodity that is exported during the period.

The example weather-based energy index embodiment described herein includes light sweet crude oil (CL), natural gas (NG), heating oil (HO), and gasoline (HU) components. Following is an example calculation of the value of the weather-based energy index, according to an embodiment of the present invention.

The prices for CL, NG, HO, and HU were determined on May 24, 2005 as listed on the NYMEX. The price of CL was $49.00/barrel. The price of NG, using the Henry Hub in Louisiana as the pricing point, was $6.40/MMBtu, where MMBtu represents one million British thermal units (i.e., one million Btu). The price HO, listed on the NYMEX as New York Harbor #2 oil, was $1.37/gallon. The price of HU was $1.40/gallon.

In this example, the prices of the commodities (CL, NG, HO, and HU) are converted to a British thermal unit (Btu) equivalent, based on the burn rate of the respective commodities. The conversion factor that is used to convert the prices to Btu equivalents is determined by the markets for the respective commodities. On May 24, 2005, the conversion factors, F, for the commodities were as follows: $F_{CL}=0.1718$, $F_{NG}=1.00$, $F_{HO}=7.21$, and $F_{HU}=7.99$, where the subscripts indicate the commodity to which the conversion factor corresponds. In this example, the conversion factors may be used to convert the prices of the commodities as listed on the NYMEX (or any other exchange) into price per million Btus (MMBtu).

Applying the conversion factors, the energy components, P, become:

$P_{CL}=\$49.00/\text{barrel}*0.1718 \text{ barrels/MMBtu}=\$8.42/\text{MMBtu}$, $P_{NG}=\$6.40/\text{MMBtu}*1.00 \text{ MMBtu/MMBtu}=\$6.40/\text{MMBtu}$, $P_{HO}=\$1.37/\text{gallon}*7.21 \text{ gallons/MMBtu}=\$9.88/\text{MMBtu}$, and $P_{HU}=\$1.40/\text{gallon}*7.99 \text{ gallons/MMBtu}=\$11.19/\text{MMBtu}$, where the subscripts indicate the commodity that corresponds to the component.

In this example, the weighting factors, W, corresponding to respective commodities are equal to the STU ratios for the respective commodities. On May 24, 2005, the weighting factors, W, were determined as follows: $W_{CL}=STU_{CL}=0.3$, $W_{NG}=STU_{NG}=0.4$, $W_{HO}=STU_{HO}=0.2$, and $W_{HU}=STU_{HU}=0.1$.

The value of the weather-based energy index, I, may be represented by the following equation:

$$I = \frac{P_{CL}*W_{CL} + P_{NG}*W_{NG} + P_{HO}*W_{HO} + P_{HU}*W_{HU}}{T}; \quad \text{(Equation 3)}$$

where T is a weather factor value.

In the example weather-based energy index described herein, the weather factor value, T, is the average temperature for a "basket of cities," though the scope of the present invention is not limited in this respect. The phrase "basket of cities" is a figurative expression that means a plurality of cities. In this example, the basket of cities includes New York City, Philadelphia, District of Columbia, Montpelier, and Dover. If the average temperature for the basket of cities during the period was 15° C., for example, the value of the weather-based energy index may be calculated as follows:

$$I = \frac{(\$8.42*0.3) + (\$6.40*0.4) + (\$9.88*0.2) + (\$11.19*0.1)}{15°C.} = 0.545.$$

The average temperature for the basket of cities may be provided in any units of measure, such as °F., Kelvin, etc. The weather factor value, T, need not necessarily be a temperature.

According to an embodiment, the value of the index is normalized based on a reference value. The reference value may be a prior value of the weather-based energy index or some other value. In this example, the normalized value, $I_N$, of the weather-based energy index based on an arbitrary reference value of 0.0005 is $$I_N = \frac{0.545}{0.0005} = 1090.$$

In an embodiment, the weather factor value, T, includes sub-values, S.

For example, the weather factor value may include an average temperature sub-value ($S_1$), a 5-year average temperature sub-value ($S_2$), a 10-year average temperature sub-value ($S_3$), and/or a 30-year average temperature sub-value ($S_4$). Sub-value $S_4$ may be a 30-year average temperature provided by the National Climatic Data Center (NCDC), for example. The NCDC 30-year average temperature may be referred to as the "Normal".

In the example above, the sub-values, $S_{1-4}$, may be combined to provide a simple average or a weighted average. For example, weighting factors may be combined with respective sub-values $S_{1-4}$. The weighting factors may be based on changes in respective sub-values $S_{1-4}$, population weighted for National Weather Services Energy Demand Cities.

The calculations described herein with respect to components, weather factor values, sub-values, etc. may be repeated for each period to generate respective weather-based energy index values. The index values may be plotted with respect to time to provide a graphical representation of the weather-based energy index.

According to an embodiment, the weather-based energy index is based on historical data (e.g., temperature, STU, supply, demand, commodity price, etc.) that begins in 1970 and continues through the present. The index may be retroactive to 1990, for example, and may be normalized to a value, such as 100. Daily weather may be provided on a next day actual basis, settling on the first day of the following month (i.e., when NWS monthly actuals are available), for example. The weather-based energy index may go up or down on a daily and monthly basis for each contract month. These movements may be compounded or netted up to the present day to generate the present day's index value.

2.2 Geographical Weather-Based Index Embodiments

According to an embodiment, the geographic region to which the weather-based index pertains can vary with time. For instance, the weather-based index may include first weather data corresponding to a first geographic region during the heating season (October-April) and second weather data corresponding to a second geographic region during the cooling season (May-September). For example, the first geographic region may be a first basket of cities that includes New York, Kansas City, Chicago and Pittsburgh. In another example, the second geographic region may be a second basket of cities that includes New York, Dallas, Houston, New Orleans, and Miami. The example cities mentioned herein are provided for illustrative purposes. The baskets of cities may include any of a variety of cities. In an embodiment, the cities that are included in the first and second baskets of cities are based on those cities utilized in an energy demand analyses performed by the United States Department of Energy. The geographic regions need not necessarily include cities.

In an alternative embodiment, the weather-based index is based on a single geographic region. For example, the weather data used to generate the weather-based index may be based on a particular region. The weather data may be measured in the Rocky Mountain region, the New England region, a basket of cities, areas in which a certain crop may be grown, or areas in which a relatively high amount of a commodity (e.g., heating oil, natural gas, etc.) is consumed, to provide some examples.

In yet another embodiment, the weather-based index may comprise multiple geographical regions pertaining to various types of retail markets and/or sectors. For instance, each geographical region may be associated with a respective weighting factor. The weighting factors may be based on one or more economic indicators, including but not limited to the Producer Price Index (PPI), the Consumer Price Index (CPI), unemployment figures, housing starts, etc.

A weather-based index may comprise financial components that represent companies in one retail sector, such as broadlines, hardlines, or specialty retailers. For example, an index based on broadline retailers may include financial components that represent companies from different geographies. The weather-based index in this example may be based on weather data corresponding to multiple geographic areas corresponding to respective retailers' trading areas for specific trading seasons (e.g., the fall/winter trading season (August-February) or the spring/summer trading season (March-July). Weather factors, each of which effects at least one of the companies, may be aggregated into one index. Other example weather seasons include but are not limited to the heating season (October-April), the cooling season (May-September), and various agricultural seasons, such as winter wheat, summer wheat, etc.

2.3 Reference Weather Factor Value Embodiments

A weather-based index value may be calculated based on a reference weather factor value. For example, the reference weather factor value may be subtracted from a measured weather factor value to provide a delta weather factor value. In this example, the delta weather factor value represents the difference between the measured weather factor value and the reference weather factor value. The weather-based index may be generated using the delta weather factor value.

The weather-based index may be generated using an absolute value of the delta weather factor value. For example, a greater difference between the measured weather factor value and the reference weather factor value may have a greater effect on the weather-based index value, regardless of whether the measured weather factor value is less than or greater than the reference weather factor value.

In an example embodiment, the value of the weather-based index is inversely proportional to temperature, and the reference weather factor value is a temperature of 65° F. A delta weather factor value may be calculated as the difference between a measured temperature and 65° F. Extreme weather in the heating season may include temperatures much less than 65° F. Extreme weather in the cooling season may include temperatures much greater than 65° F. If the value of the weather-based index is calculated based on the absolute value of the delta weather factor value, then extreme weather leads to a relatively lower weather-based index value, regardless of the season. Extreme weather may be reflected in the weather-based index by a relatively lower index value.

According to another example embodiment, the value of the weather-based index is directly proportional to temperature. In this embodiment, extreme weather may be reflected in the weather-based index by a relatively high index value.

2.4 Other Weather-Based Index Embodiments

A weather-based index may include any type of component(s).

According to an embodiment, a weather-based retail index is based on retail stock(s) and/or economic information. A component of the weather-based retail index may represent a same-store-sales value of an equity, a rate-of-change value of an equity, or a dividends paid per period for an equity, to provide some examples. Same store sales may be based on any period (e.g., weekly, monthly, quarterly, or yearly). Same store sales may be normalized based on any historical or average data, though the same store sales need not necessarily be normalized. For instance, same store sales may be normalized based on a yearly average (e.g., for last year, two years ago, or any other year), a 5-year average, a maximum or minimum for a time period, or any other historical information. A rate of change of an equity indicates the difference between the price of the equity at a first time and the price of the equity at a second time. This rate of change is commonly referred to as the "delta" of the equity. The rate of change (i.e., delta) is a measure of the change in price over a period. A component may be based on an economic indicator, including but not limited to the Producer Price Index (PPI), Consumer Price Index (CPI), unemployment figures, housing starts, etc.

In another embodiment, a weather-based insurance index is based on information that is relevant to the insurance industry. A components of the weather-based insurance index may be based on any of a variety of insurance variables, including but not limited to stock of an insurance company, insurance claim data, insurance-based financial risk exposure (e.g., potential payout), etc. Persons skilled in the art will recognize that the weather-based concepts described herein can be applied to any of a variety of industries and/or markets.

3.0 Example System Implementation

3.1 System Architecture Overview

FIG. 1 is a block diagram of a weather-based index trading system 100 according to an embodiment of the present invention. Weather-based index trading system 100 can be used for initializing a weather-based index, for calculating a present value of a weather-based index, and/or for trading a weather-based index. The example architecture shown in FIG. 1 is for illustrative purposes and is not intended to limit the present invention. Other implementations for performing the functions described herein will be apparent to persons skilled in the relevant art(s) based on the teachings contained herein, and the invention encompasses such other implementations.

Referring to FIG. 1, weather-based index trading system 100 includes a communication network 120, which is coupled to one or more external users 118a-118n via the Internet 116. The variable "n" indicates that any number of external users 118a-118n may be connected to communication network 120. Communication network 120 may be coupled to Internet 116 via a firewall, such as firewall 114.

Communication network 120 may be any type of network, such as a local area network (LAN), a wide area network (WAN), etc. Communication network 120 includes a trading server 102, databases 104a-d, an administration workstation 106, a live exchange data feed 108, and a web server 110. Communication network 120 need not necessarily include all elements 102-110 shown in FIG. 1.

Trading server 102 communicates with other elements 104-110 of communication network 120. Trading server 102 may be referred to as the "back-end" or "processing system" of communication network 120. FIG. 1 shows one trading server 102 for illustrative purposes. However, it will be recognized by persons skilled in the relevant art(s) that communication network 120 may include more than one trading server 102.

Databases 104a-d store information associated with financial component(s) and/or weather factor(s) that may be used to generate the weather-based financial index. Databases 104a-d may be stored in memory of trading server 102 or any other server or computer. Databases 104a-d need not necessarily be stored in the same memory. For example, databases 104a-d may be distributed among a plurality of computers/servers.

Administrative workstation 106 may be used by a trading organization, for example, to update, maintain, monitor, and/or record information associated with the weather-based financial index. For instance, the information may be statistics based on component(s) or weather factor(s) that may be used to generate the weather-based financial index.

Live exchange data feed 108 is coupled between Internet 116 and trading server 102 to provide information from an exchange (e.g., NYMEX) to trading server 102. The information may include contract prices for components of the weather-based financial index or for the index itself. For example, live exchange data feed may provide real-time quotes of the weather-based financial index or components thereof. Live exchange data feed 108 need not necessarily provide live exchange data. For example, live exchange data feed 108 may provide over-the-counter price information and/or any other information that is relevant to the weather-based index.

Web server 110 transmits data representing Web pages in response to, for example, Hypertext Transfer Protocol (HTTP) requests from remote browsers. Web server 110 serves as the "front end" of communication network 120. For example, Web server 110 may provide a graphical user interface (GUI) to users of weather-based index trading system 100 in the form of Web pages. Such users may access Web server 110 via any one or more of terminals 118a-n. Terminals 118a-n may be accessible at a facility of a trading organization, for example.

Firewall 114 may be provided as an interface between communication network 120 and Internet 116. For example, firewall 114 may be connected between web server 110 and Internet 116, between live exchange data feed 108 and Internet 116, or any other element 102-106 of communication network 120 and Internet 116. Firewall 114 determines whether information is allowed to be received by communication network 120 from Internet 116, or vice versa. Firewall 114 utilizes security software to monitor such information. For example, firewall 114 may allow information to be received based on whether firewall 114 recognizes a domain name and/or Internet Protocol (IP) address associated with the information. Firewalls are well known in the relevant art(s).

Internet 116 facilitates communication between communication network 120 and workstations 118a-n, which are external to communication network 120. Workstations 118 may allow traders (e.g., client-users of the trading organization) to remotely access and use weather-based index trading system 100.

Trading system 100 may allow a user at a workstation 118, for example, to buy or sell a weather-based financial index contract or to trade a commodity, equity instrument, or income instrument based on the weather-based financial index.

3.2 Weather History Database

FIG. 2 illustrates weather history database 104a of FIG. 1 according to an example embodiment of the present invention. Embodiments of weather history database 104a are described in commonly-owned U.S. Pat. No. 5,832,456, entitled "System and Method for Weather Adapted, Business Performance Forecasting," which is incorporated herein by reference in its entirety.

In the example of FIG. 2, weather history database 104a includes period data 202, geographical data 204, weather factor data 206, and value data 208 for each database entry 210. Period data 202 provides the period to which the weather information in database entry 210 pertains. In FIG. 2, period data 202 is annual or yearly data, though the scope of the present invention is not limited in this respect. The period may be any increment of time, such as daily, weekly, bi-weekly, monthly, bi-monthly, quarterly, etc.

Geographical data 204 specifies the geographical region(s) or area(s) to which the weather information in database entry 210 pertains. In the example of FIG. 2, "MSA 100" indicates that the weather information in database entry 210 corresponds to a particular metropolitan statistical area (MSA), which is specified as MSA 100. Geographical data 204 is based on a MSA for illustrative purposes and is not intended to limit the types of geographical regions or areas that may be included in weather history database 104a.

Geographical data 204 may be provided for any type of geographic area/region, such a city, a county, a state, and/or a region Weather factor data 206 indicates the weather factor to which the weather information in database entry 210 pertains. Although example weather factors are discussed above, the example weather factors shown in FIG. 2 will now be described.

In FIG. 2, weather history database 104a includes seasonal (or average), actual, and category (also referred to as "weather pattern") weather factors. Seasonal weather factors are designated by suffix .SEA, actual weather factors have no suffix, and category weather factors are designated by suffix .CAT.

In the example of FIG. 2, the weather factors include seasonal average mean, maximum, or minimum temperatures (TEMP.SEA), seasonal average snowfall (SNOW.SEA), seasonal average precipitation (PREC.SEA), actual snowfall (SNOW), actual precipitation (PREC), actual temperature (TEMP), actual temperature versus seasonal temperature (TEMP.CAT), actual precipitation versus seasonal precipitation (PREC.CAT), actual temperature versus last year temperatures, and actual precipitation versus last year precipitation. These weather variables may be measured versus any historical average or benchmark. The example weather factors shown in FIG. 2 are provided for illustrative purposes and are not intended to limit the scope of the present invention. Other weather factors or types thereof may be used.

Value data 208 provides the value of the weather factor specified in weather data 206 for sub-periods (Sub 1-Sub 6). Value data 208 may include one or more sub-periods. Sub-periods (Sub 1-Sub 6) may be any proportion of the period specified in period data 202 of database entry 210. For example, value data 208 may provide the value of the weather factor for the period that is specified by period data 202 of database entry 210. Sub-periods (Sub 1-Sub 6) may be weeks, months, quarters, seasons, days, etc.

As shown in FIG. 2, the value of the category weather factors (e.g., TEMP.CAT and (PREC.CAT) may be −1, 0, or 1. A value of "−1" indicates that the actual value of the weather factor is greater than the seasonal value of the weather factor. A value of "0" indicates that the actual value and the seasonal value are substantially the same. For example, the actual value may equal or substantially correspond to the seasonal value. A value of "−1" indicates that the actual value of the weather factor is below or less than the seasonal value of the weather factor. Values other than those specified above may be used for the category weather factors.

3.3 Component Database

FIG. 3 illustrates component database 104c of FIG. 1 according to an example embodiment of the present invention. Component database 104c includes information corresponding to historical, current, and/or future price(s) of at least one component, based on a respective reference unit. Example reference units include but are not limited to volume, weight, or the instrument itself. Reference units are represented using units of measure, such as gallon, barrel, ounce, ton, etc.

According to an embodiment, historical component information and future component information are stored in separate component databases, though the scope of the present invention is not limited in this respect. For ease of discussion, component database 104c is described below as including historical component information. It will be recognized by persons skilled in the relevant art(s) that component database 104c may include historical, current, or future component information, or any combination thereof.

In FIG. 3, component database 104c includes monthly component information 302a-l for illustrative purposes, though the component information in component database 104c may be based on any period. In FIG. 3, monthly component information 302a-l is based on gas contracts for illustrative purposes. Each monthly component information 302a-l includes daily high, low, and closing prices for gas contracts corresponding to the respective month. Monthly component information 302a-l may be based on any component or the weather-based financial index itself. The daily high, low, and closing prices shown in FIG. 3 may be provided for any period of time. For example, the daily prices may be provided for the previous five years.

As will be appreciated by one skilled in the relevant art(s), component database 104c may include other component and/or financial information. For example, component database 104c may include weighting factor information corresponding to respective components.

3.4 Inventory Database

Inventory database 104d includes historical, current, and/or future inventory information based on at least one component of the weather-based financial index. According to an embodiment, the inventory information includes stocks-to-use (STU) information corresponding to respective component(s). The STU information may include value(s) for beginning stocks, ending stocks, production, imports, demand, exports, and/or stocks-to-use ratio(s), to provide some examples. For example, the STU information or a portion thereof may be obtained from the Department of Energy, Energy Information Administration. Inventory database 104d need not necessarily include STU information. For example, inventory database 104d may include some other type of supply and/or demand information. In another example, inventory database 104d may not include supply or demand information.

In another embodiment, database 104d includes inventory information provided by at least one agency corresponding to respective component(s) of the weather-based financial index. For example, the inventory information may include historical Energy Information Administration (EIA) inventory information. The EIA conducts technical research and helps create standards for equipment and products for the natural gas industry. The EIA also compiles statistics, which are used as standards for the natural gas industry. One such statistic is the weekly inventory of natural gas, which is measured in cubic feet and is based on each of three regions of the United States: (1) the Producing Region (i.e., the gulf coast); (2) the Consuming East Region (i.e., east of the Rocky Mountains); and (3) the Consuming West Region (i.e., west of the Rocky Mountains). For example, inventory database 104d may include fifty-two weekly measurements for each of the three regions for a historical time period (e.g., the previous five years). Inventory database 104d may include the most currently available EIA inventory information (e.g., information that covers the present week).

The EIA inventory data in inventory database 104d for the three regions may be correlated with weather information in weather history database 104a and/or weather forecast database 104b. For example, the EIA inventory data and the weather information in weather history database 104a and weather forecast database 104b may be based on a basket of cities, as discussed above.

4.0 Using the Weather-Based Index for Trading

A weather-based index may be used for trading commodities, equity instruments, and/or income instruments, to provide some examples. The index may be used to determine whether to buy or sell a contract, how many contracts to trade, etc. For example, the index may be used to trade component(s) of the index or the index itself.

The weather-based index has a settlement period that is based on the settlement period of component(s) of the index. For example, if component(s) of the index settle once per month, then the weather-based index settles once per month. The weather-based index can have any settlement period, including but not limited to yearly, quarterly, daily, hourly, or every minute. The index settles after all component(s) of the index settle for the period.

The weather-based index may be traded on an exchange, such as the NYMEX, the NYSE, or any other exchange. The instrument used to trade the weather-based index can be the same as an instrument upon which the component(s) of the index are based. For example, if component(s) of the index are prices per unit for futures contracts, then weather-based index may be traded using futures contracts. If the component(s) are prices per unit for options contracts, then the weather-based index may be traded using options contracts. If the component(s) are prices per unit for stock contracts or other equity instruments, then the weather-based index may be traded using stock contracts or other equity instruments.

5.0 Predicting a Value of the Weather-Based Index

Value(s) of a weather-based index may be predicted for any of a variety of reasons. A predicted index value may provide insight into the direction of a component of the index, a market or industry corresponding to the component, or the index itself. Technical traders, for example, may use a predicted index value to determine a trend or reversal in the index, a component of the index, or a corresponding market or industry. A predicted index value may be used to determine whether a commodity, an equity instrument, an income instrument, or the index itself should be purchased, when it should be purchased, and/or how many contracts should be purchased.

Predicted value(s) of the weather-based index may be used by retailers, manufacturers, restaurants, etc. to facilitate operational activities, such as planning, allocation, assortment, replenishment, pricing, mark-down management, or inventory, to provide some examples. An insurer may use predicted value(s) of the index to evaluate future weather-related risk. The insurer may base insurance premiums on the predicted value(s), for example.

Value(s) of the weather-based index may be predicted using any of a variety of techniques. According to an embodiment, a predicted weather factor value is combined with anticipated forward contract settlement price(s) (e.g., known future component(s)) to determine future index value(s). When a commodity price, for example, and a corresponding weighting factor are known, then a future weather-based index value may be determined by combining the known forward commodity price and weighting factor with a predicted weather factor value.

In another embodiment, a weighting factor and/or a future component (e.g., the settlement price of a commodity) are not known. The weighting factor and/or the settlement price may be predicted using any of a variety of methods. For example, the settlement price may be predicted based at least in part on a relationship between the settlement price and a predicted weather factor value. A future weather factor value may be determined in any of a variety of ways. The relationship between weather factor values and components may be derived based on historical weather data and historical component data to provide a relationship algorithm. The relationship algorithm may be determined using regression analysis, for example. The future weather value may be provided as an operand in the relationship algorithm to generate a predicted price for the commodity. The future weather factor value and the predicted price of the commodity may be provided as operands in an equation that defines the weather-based index to provide a predicted value of the index.

5.1 Weather Forecast Database

FIG. 4 illustrates weather forecast database 104b of FIG. 1 according to an example embodiment of the present invention. Embodiments of weather forecast database 104b are described in commonly-owned U.S. Pat. No. 5,832,456.

In the example of FIG. 4, weather forecast database 104b includes period data 202, geographical data 204, weather factor data 206, and value data 208 for each database entry 210. The forecasted weather information in weather forecast database 104b is provided on an annual or yearly basis for illustrative purposes. The period for which forecasted weather information is provided need not necessarily be annually. The period may be any increment of time, such as daily, weekly, bi-weekly, monthly, bi-monthly, quarterly, etc.

In FIG. 2, a period of "N+1" indicates one period in the future based on a reference period. The reference period typically is the latest period for which values of the weather factor are available, though the scope of the present invention is not limited in this respect. The reference period may be any period for which historical or forecasted information is available.

Weather forecast database 104b includes one or more database entries 402, each containing information that indicates the weather that is predicted to occur in a geographical region/area in a future time period. In the example of FIG. 4, forecasted values are provided for six weather factors. Weather forecast database 104b may include forecasted weather information for any number of weather factors.

Weather forecast database 104b includes three types of weather factors: seasonal, actual and category. These categories are the same as those described above with respect to weather history database 104a, though the scope of the present invention is not limited in this respect. The description of weather history database 104a provided above also applies to weather forecast database 104b, and vice versa.

5.2 Relationship Between History and Forecast Databases

Weather history database 104a and weather forecast database 104b each include information on a per period basis. The increment of time represented by a period in the weather history database 104b and the increment of time represented by a period in the weather forecast database 104b may be the same. The periods in databases 104a and 104b may be synchronized. For example, the increment of time may be set equal to one month for both databases 104a and 104b in an administration setup process using administration workstation 106 of FIG. 1. In this example, if period P1 represents January, then P1 in weather history database 104a represents January of a previous year, and P1 in weather forecast database 104b represents January of a future year.

According to an embodiment, weather history database 104a and weather forecast database 104b include geographical data 204 that may correspond to one or more "baskets of cities". A "basket of cities" is a figurative expression, meaning a plurality of cities. During the heating season (October-April), value data 208 for a basket of cities, including New York, Kansas City, Chicago and Pittsburgh, may be desired. During the cooling season (May-September), value data 208 for another basket of cities, including New York, Dallas, Houston, New Orleans, and Miami may be desired.

In one embodiment of the present invention, the heating season basket of cities and/or the cooling season basket of cities includes cities utilized by the United States Department of Energy for performing a demand analysis.

5.3 General System Operation

Weather-based index values may be predicted/forecasted in any of a variety of ways. Various example forecasting techniques are described below. However, the present invention is not intended to be limited to these examples. Persons skilled in the relevant art(s) will recognize that other forecasting techniques may be used.

According to some embodiments, a future value of the weather-based index is calculated based on historical values of the index. For instance, a regression analysis may be used to determine the future value of the index, based on the historical values. The regression analysis may be performed using any of a variety of equations, such as:

$$I=(K*T)+C; \qquad \text{(Equation 4)}$$

where K is a coefficient, T is a weather factor value, and C is a constant. Persons skilled in the relevant art(s) will recognize that other equations may be used to perform the regression analysis.

In other embodiments, a future value of the weather-based index is calculated based on predicted or known future value(s) of component(s) of the index. For example, a value of the weather-based index may be represented by the following equation:

$$I = \sum_{i=1}^{n} \frac{P_i * W_i}{T}; \qquad \text{(Equation 5)}$$

where $P_i$ is a component of the index, $W_i$ is a weighting factor corresponding to component $P_i$, T is a weather factor value, and n is the number of components in the index. It will be recognized by persons skilled in the relevant art(s) that other equations may be used to represent the weather-based index.

According to one embodiment, future component(s) and/or future weighting factor(s) of the weather-based index are known. For example, a future price of a commodity, an equity instrument, or an income instrument may be predetermined based on a contract price thereof. In the present month, a contract may be purchased for the commodity, equity instrument, or income instrument for a future month at an established price per reference unit. The established price per reference unit may represent a future component of the weather-based index. In another example, a future weighting factor may be provided by a governmental agency, an industry organization, etc. For instance, if the weighting factor is based on a stocks-to-use ratio, the stocks-to-use ratio for a future month may be known or predetermined.

In this embodiment, a value of the weather-based index may be calculated by predicting the weather factor value(s) and combining the predicted weather factor value(s) with respective known component(s) and/or weighting factor(s) (e.g., using Equation 5).

In an alternative embodiment, future component(s) and future weighting factor(s) are not known. Historical component(s) and historical weighting factor(s) may be used to determine future values thereof. Regression analysis may be used to determine a relationship between historical component(s), historical weighting factor(s), and historical weather factor(s). The result of the regression analysis is a relationship represented by an equation. Predicted weather factor(s) may be provided as operand(s) in the equation to determine the value of the weather-based index.

Figure 5:
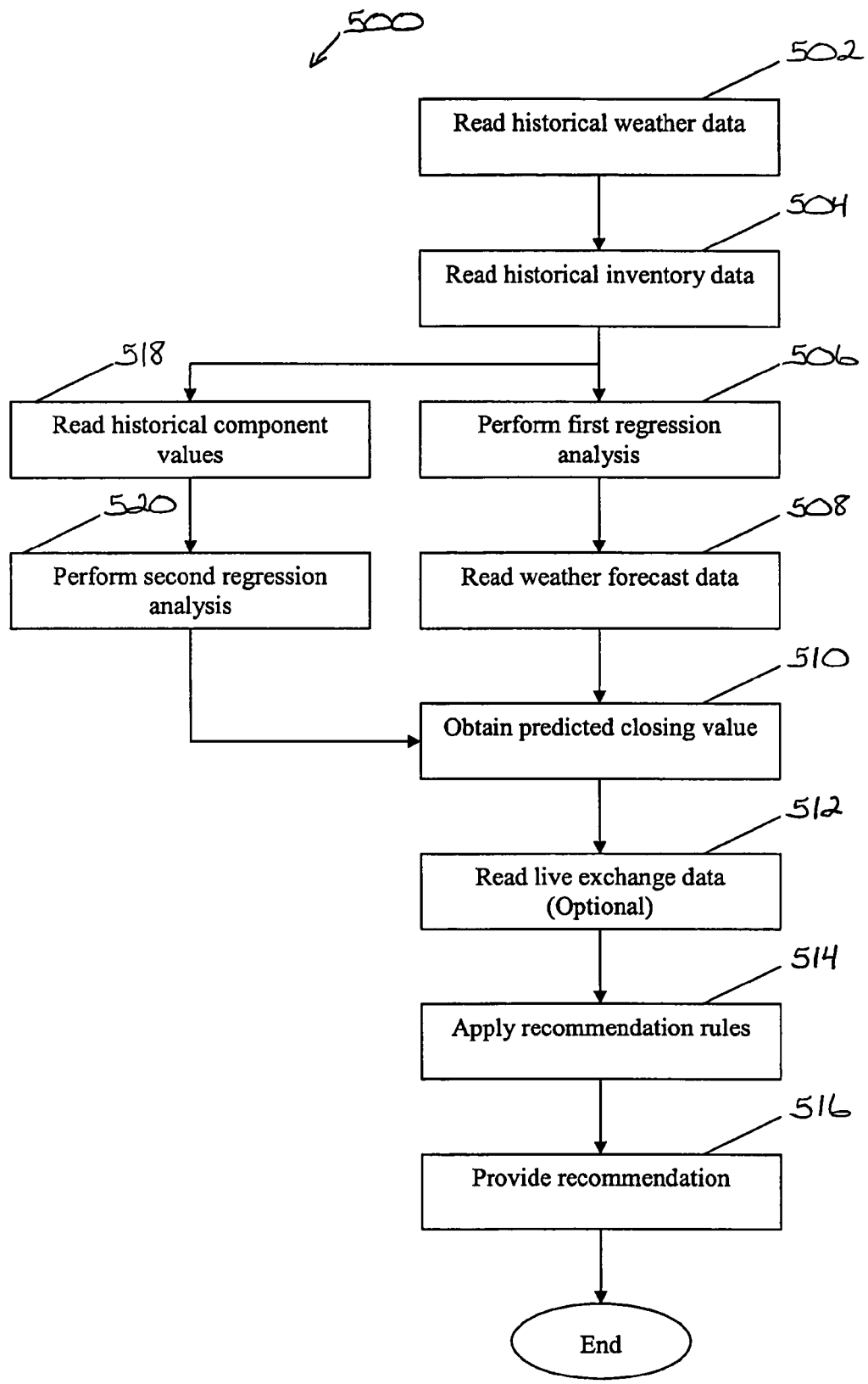
FIG. 5 is a flowchart for a method of providing a recommendation according to an embodiment of the present invention.

FIG. 5 is a flowchart of a method of providing a recommendation according to an embodiment of the present invention. The recommendation indicates an action (or inaction) that a user should take with respect to weather-based financial index contract(s). Flowchart 500 may be used to determine the number of weather-based financial index contracts to buy or sell, whether to make a trade, the type of trade that should be made, etc.

Referring to FIG. 5, historical weather data are read at block 502 by, for example, a computer system and/or a user. For example, the historical weather data may be read from weather history database 104a, a commercial database, or governmental agency database. According to an embodiment, the historical weather data includes weather information (e.g., temperature information) for each city in a cooling season basket of cities and/or a heating season basket of cities. The historical weather data for each city in the heating season or cooling season basket of cities may be equally considered. Alternatively, the weather data for each city may be combined with a weighting factor. The weighting factor may be based on population, precipitation, etc.

At block 504, historical inventory data corresponding to each component of the weather-based financial index are read by, for example, a computer system and/or a user. For instance, the historical inventory data may be read from inventory database 104d, a commercial database, or governmental agency database.

The historical weather data and the historical inventory data may cover any period of time. According to an embodiment, the period is a one-year period that ends at the present date. In another embodiment, the period is at least five years.

A first regression analysis is performed at block 506 for each component of the weather-based financial index. In a first embodiment, the first regression analysis utilizes linear regression. As will be appreciated by those skilled in the relevant art(s), linear regression may be used as a multi-variate modeling technique. For example, linear regression may use several variables to predict values of a single continuous dependent variable.

In a second embodiment, the first regression analysis utilizes non-linear regression (e.g., curvilinear regression, log-linear analysis, etc.). Non-linear regression techniques are well-known in the relevant art(s). For instance, non-linear regression techniques are described in detail in David G. Kleinbaum et al., "Applied Regression Analysis and Other Multivariable Methods," Duxbury Press (3rd Ed. 1998), ISBN 0534209104, which is incorporated herein by reference in its entirety.

In general, regression may be used to generate coefficients for each of a plurality of predictors. Regression may show the proportion of the variability of a dependent variable that is explained by each predictor. Regression may provide a measure of volatility (e.g., standard deviation). Regression may be used to generate a predictive model. Embodiments of the present invention may utilize any type of regression.

According to the first embodiment, the first regression analysis of block 506 may be represented mathematically using a linear equation, such as $$y=m_1x+b;$$ (Equation 6)

where $m_1$ is the slope and b is the y-axis intercept of the line. Using the historical inventory data as the y-axis and the historical weather (e.g., temperature) data as the x-axis, the first regression analysis of block 506 produces a straight line, having a slope of $m_1$, based on the data points.

Historical component values are read at block 518 for each component of the weather-based financial index. For example, the historical component values may be read from component database 104c.

A second regression analysis is performed at block 520 for each component of the index. The second regression analysis may be a multi-variate (e.g., three-dimensional) regression analysis, though the scope of the invention is not limited in this respect. The regression analysis may be based on any number of variables, including one.

The second regression analysis of block 520 may use the historical component values as the y-axis, historical weather data as the x-axis, and historical inventory data as the z-axis, in order to obtain an estimate of component values for each month, for example. The second regression may be represented mathematically as $$y=m_1x_1+m_2x_2+b;$$ (Equation 7)

where y is the component value, $m_1$ is the inventory data, $x_1$ is the weather data, $x_1$ is the historical inventory data, $x_2$ is the historical weather data, and b is the y-axis intercept. The second regression analysis of block 520 provides a straight line based on the data points. The second regression analysis may provide a measure of price volatility (e.g., standard deviation).

Weather forecast data is read at block 508. A predicted value for the weather-based financial index is obtained at block 510, based on predicted value(s) for component(s) of the index. For example, the results of the first and second regression analyses of respective blocks 506 and 520 may be used to obtain the predicted value of the index. The predicted value of the weather-based financial index may be referred to as the "baseline value".

Equation 7 is used to compute the predicted direction and/or possible value(s) for component(s) of the weather-based financial index. In Equation 7, the predicted value for each component may be represented by variable "y". The future weather value may be represented by the variable "$x_2$". The variable "y" from Equation 6 may be provided as the variable "$x_1$" in Equation 7.

The baseline value of the weather-based financial index may be determined by combining the predicted value(s) and/or possible direction(s) for the component(s) of the index. According to an embodiment, component(s) of the index are combined with a weather factor to provide the baseline value. For example, components of the weather-based financial index may be combined with respective weighting factors to provide the baseline value. In an embodiment, components, respective weighting factors, and at least one weather factor are combined in accordance with Equation 5 provided above.

According to an embodiment, a linear regression may be performed using historical weather data and historical values of the weather-based financial index (rather than the components thereof) to provide the baseline value.

Live exchange data may be read at block 512, though the scope of the present invention is not limited in this respect. For example, other data (such as over-the-counter price information) or no data may be read at block 512. In FIG. 5, the live exchange data may be provided by any of a variety of sources, including but not limited to an exchange (e.g., NYMEX), a brokerage firm, or a news agency or company. For example, the live exchange data may include the most recently available value of the weather-based financial index. The live exchange data may be provided as a real-time quote.

Recommendation rules (i.e., conditions) are applied at block 514 to provide a recommendation at block 516. For example, the recommendation may be to buy, sell, or hold weather-based financial index contract(s). In another example, the recommendation may indicate the number of contracts to buy or sell.

Table 1 provides example recommendation rules that may be applied at block 514 to provide the recommendation at block 516, according to an embodiment of the present invention. In Table 1, the recommendation rules have the following pseudo-code notation: "if (recommendation rule) Recommendation".

TABLE 1

Inputs:  B = baseline value of the weather-based financial index obtained at block 510
F = current weather-based financial index price obtained at block 512
δ = standard deviation obtained from second regression analysis at block 520

Output:

(Equation 8)
$$n = \frac{F - B}{\sigma} = \text{number of } \delta\text{'s away from baseline;}$$

The recommendation rules can be applied as follows:
if (n > $n_1$)
    Recommendation 1 (Index moving down)
else if (n > $n_2$)
    Recommendation 2 (Index moving down)
else if (n > $n_3$)
    Recommendation 3 (Neutrality)
else if (n > $n_4$)
    Recommendation 4 (Neutrality)
else if (n > $n_5$)
    Recommendation 5 (Index moving up)
else
    Recommendation 6 (Index moving up)
where $n_1 = 1.0$, $n_2 = 0.5$, $n_3 = 0$, $n_4 = -0.5$, and $n_5 = -1.0$.

Because weather factors and components may have opposing effects on the index, the following scenario(s) is just one, but not all scenarios that may apply.

Referring to Table 1, if recommendation rule "n>$n_i$" is satisfied, then "Recommendation 1" is provided at block 516. "Recommendation 1" may indicate to sell a call or put, buy a put, or sell the index, to provide some examples. If recommendation rule "n>$n_1$" is not satisfied and recommendation rule "n>$n_2$" is satisfied, then "Recommendation 2" is provided at block 516. "Recommendation 2" may indicate to sell a call or put, buy a put, or sell the index, to provide some examples. According to an embodiment, Recommendation 1 provides a stronger recommendation to sell the index than Recommendation 2. For instance, Recommendation 1 may indicate "Strong Sell", and Recommendation 2 may indicate "Sell". If recommendation rule "n>$n_2$" is not satisfied and recommendation rule "n>$n_3$" is satisfied, then "Recommendation 3" is provided at block 516. For example, "Recommendation 3" may indicate to write a put or take no action. If recommendation rule "n>$n_3$" is not satisfied and recommendation rule "n>$n_4$" is satisfied, then "Recommendation 4" is provided at block 516. For example, "Recommendation 4" may indicate to buy a call or take no action. If recommendation rule "n>$n_4$" is not satisfied and recommendation rule "n>$n_5$" is satisfied, then "Recommendation 5" is provided at block 516. "Recommendation 5" may indicate to buy a call, sell or buy a put, or buy the index, to provide some examples. Otherwise, "Recommendation 6" is provided at block 516. "Recommendation 6" may indicate to buy a call, sell or buy a put, or buy the index, to provide some examples. In an embodiment, Recommendation 6 provides a stronger recommendation to buy the index than Recommendation 5. For instance, Recommendation 6 may indicate "Strong Buy", and Recommendation 5 may indicate "Buy".

In Table 1, the values $n_1$ to $n_5$ are example values, which are not intended to limit the scope of the present invention. Table 1 may include any number of decision statements, such as the if-then statements shown.

Equation 8 in Table 1 effectively converts prices into standard deviation values. Thus, the further away n is from the baseline, the stronger the recommendation signal. The values of $n_1$ to $n_5$, can be subjectively varied based on the observations of a trading organization or the specific implementation of the predictive model used in the price analysis. As will be apparent to one skilled in the relevant art(s), various analyses of historical component or index prices that are correlated with weather can be used to determine the values of $n_1$ to $n_5$ that yield the best recommendations. For example, varying the values $n_1$ to $n_5$ may allow a user to achieve more successful trades or recommendations.

One of the six recommendations shown in Table 1 may be provided to a user of index trading system 100. These example recommendations are summarized in Table 2 below.

TABLE 2

| Recommendations | Explanation/Condition |
| --- | --- |
| Recommendation 1 | This is a strong signal to buy an index futures contract.<br>Condition: The current index or index futures price is well below the predicted closing price. |
| Recommendation 2 | Buy an index futures contract.<br>Condition: The current index or index futures price is below the predicted closing price. |
| Recommendation 3 | Buy a call option on the index futures contract for that month. When the option comes due, the user may exercise the option if the strike price is below the contract closing price or buy at the contract closing price.<br>Condition: The current index or index futures price is below or close to the predicted closing price. |
| Recommendation 4 | Write (i.e., sell) a put option on the index futures contract for that month. When the option comes due, the buyer of the option may sell the index contract to the user if the market price is below the strike price or let the option expire, allowing the user to buy at the index contract closing price.<br>Condition: The current index or index futures price is above or close to the predicted closing price. |
| Recommendation 5 | Sell an index futures contract.<br>Condition: The current index or index futures price is above the predicted closing price. |
| Recommendation 6 | This is a strong signal to sell an index futures contract.<br>Condition: The current index or index futures price is well above the predicted closing price. |

Figure 6:
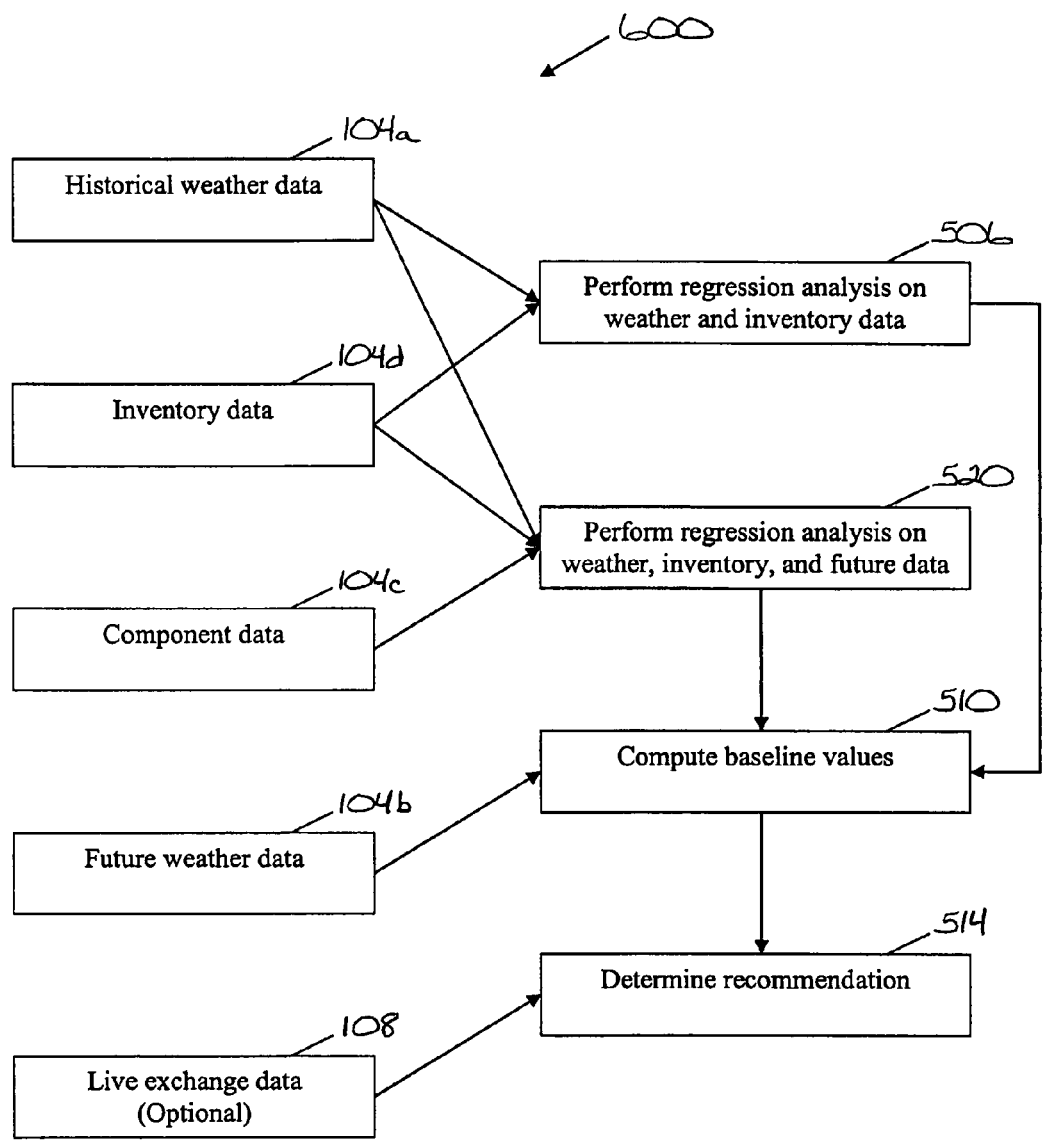
FIG. 6 illustrates a control flow representation of the flowchart shown in FIG. 5 according to an embodiment of the present invention.

FIG. 6 illustrates a control flow representation of the flowchart shown in FIG. 5 according to an embodiment of the present invention. As will be appreciated by persons skilled in the relevant art(s), control flow representation 600 illustrates how weather-based index trading system 100 components interact during the operation of flowchart 500 according to one embodiment of the present invention.

5.4 Graphical User Interface

A user of weather-based index trading system 100 shown in FIG. 1 may receive a recommendation via a graphical user interface (GUI), such as GUI 700 shown in FIG. 7, according to an embodiment of the present invention. For example, trading server 102 may provide GUI 700 to users at terminals 118a-n. GUI 700 may allow a user to provide inputs and to receive outputs as described above with reference to flowchart 500 of FIG. 5. Trading server 102 and Web server 110 may cooperate to provide GUI 700 to in-house users and/or external users.

In the embodiment of FIG. 7, each row of data in GUI 700 corresponds to a respective weather-based financial index contract, having an expiration date as specified in column 702. GUI 700 includes column 704 labeled "Days", indicating the number of days until that particular month's contract expires. Column 702 indicates the month and year of the contract to which the row of data corresponds. Column 706 includes weather information associated with respective contracts. Column 708 includes respective current/last index contract prices. For example, the current index contract prices may be available from a regulated exchange on which such contracts are traded (e.g., NYMEX). The current index contract prices may be obtained from live exchange data feed 108, for example. Column 710 includes the change in price for each contract based on a previous price (e.g., yesterday's closing price).

Column 712 indicates the volatility of the price of respective contracts. The volatility may be calculated using the Black-Scholes option pricing model, which is based on stochastic calculus. As is well-known in the relevant art(s), the Black-Scholes option pricing model is an extensively used options pricing model, which is described in detail in a variety of publicly available documents, such as Neil A. Chriss, "The Black-Scholes and Beyond Interactive Toolkit: A Step-by-Step Guide to In-depth Option Pricing Models," McGraw-Hill (1997), ISBN: 078631026X, which is incorporated herein by reference in its entirety.

Columns 714*a-e* provide prices for components of the weather-based financial index. For example, prices in columns 714*a-e* may represent contract prices for respective components, having expiration dates corresponding with the date provided in column 702. In the embodiment of FIG. 7, the price of light sweet crude oil (CL) is provided in column 714*a*, the price of natural gas is provided in column 714*b*, the price of heating oil (HO) is provided in column 714*c*, the price of gasoline is provided in column 714*d*, and the price of Pennsylvania Jersey Maryland electricity (JM) is provided in column 714*e*. JM is an example of an independent system operator (ISO). Other example independent system operators include but are not limited to New York System Operator (NYSO) and Cinergy. The weather-based financial index may be based on any number of ISOs, though the weather-based financial index need not necessarily be based on an ISO. GUI 700 may include any number of columns to represent price(s) of component(s) of the weather-based financial index.

For each weather-based financial index contract shown in GUI 700, column 716 indicates a recommendation as described above with reference to Tables 1 and 2.

If a recommendation in column 716 relates to an option contract (e.g., a call or a put), column 718 indicates the option premium associated with the option contract. As will be appreciated by those skilled in the relevant art(s), a premium is the up-front, non-refundable amount that a buyer pays a seller to obtain acquire the rights associated with the option. The option premium is determined competitively by buyers and sellers in open trading on an exchange (e.g., NYMEX) trading floor.

It should be understood that the control flows 500 and 600, shown in respective FIGS. 5 and 6, and GUI 700 of FIG. 7 are presented for illustrative purposes and are not intended to limit the scope of the present invention. The present invention is sufficiently flexible and configurable such that users using workstations 118*a-n* may navigate through weather-based trading system 100 in ways other than those shown in the figures.

6.0 Environment

Figure 8:
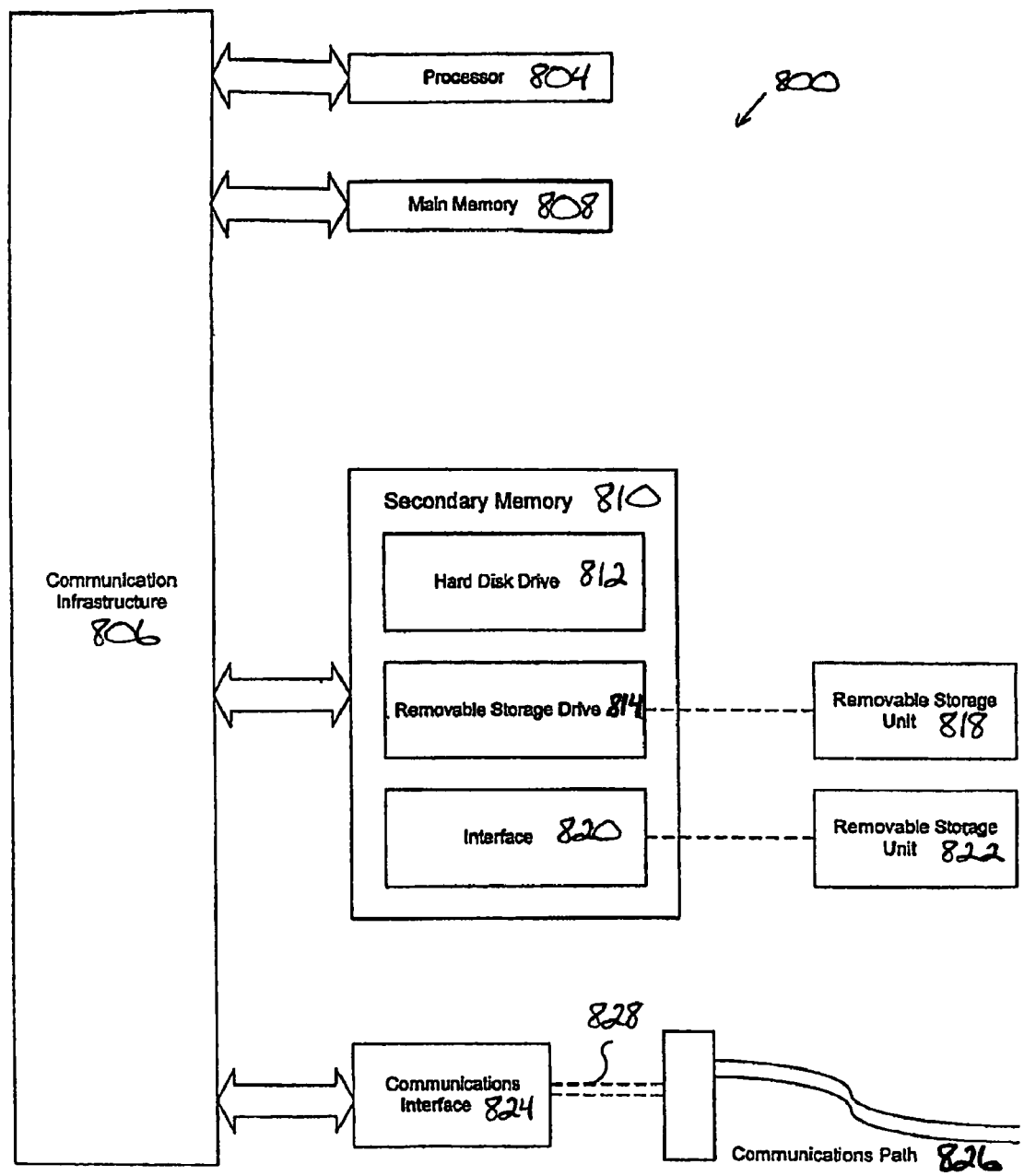
FIG. 8 illustrates an example computer system, in which the present invention may be implemented as programmable code.

FIG. 8 illustrates an example computer system 800, in which one or more aspects of the present invention may be implemented as programmable code. Various embodiments of the invention are described in terms of the example computer system 800. Any of a variety of aspects of the invention may be implemented as programmable code, including but not limited to generating values of the weather-based financial index, buying or selling a weather-based financial index contract, forecasting a future value of the index, or trading a commodity, equity instrument, or income instrument based on the weather-based financial index. After reading this description, it will become apparent to a person skilled in the art how to implement the invention using other computer systems and/or computer architectures.

Computer system 800 includes one or more processors, such as processor 804. Processor 804 may be any type of processor, including but not limited to a special purpose or a general purpose digital signal processor. Processor 804 is connected to a communication infrastructure 806 (for example, a bus or network). Various software implementations are described in terms of this exemplary computer system. After reading this description, it will become apparent to a person skilled in the art how to implement the invention using other computer systems and/or computer architectures.

Computer system 800 also includes a main memory 808, preferably random access memory (RAM), and may also include a secondary memory 810. Secondary memory 810 may include, for example, a hard disk drive 812 and/or a removable storage drive 814, representing a floppy disk drive, a magnetic tape drive, an optical disk drive, etc. Removable storage drive 814 reads from and/or writes to a removable storage unit 818 in a well known manner. Removable storage unit 818 represents a floppy disk, magnetic tape, optical disk, etc., which is read by and written to by removable storage drive 814. As will be appreciated, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from removable storage unit 822 to computer system 800.

Computer system 800 may also include a communication interface 824. Communication interface 824 allows software and data to be transferred between computer system 800 and external devices. Examples of communication interface 824 may include a modem, a network interface (such as an Ethernet card), a communication port, a Personal Computer Memory Card International Association (PCMCIA) slot and card, etc. Software and data transferred via communication interface 824 are in the form of signals 828 which may be electronic, electromagnetic, optical, or other signals capable of being received by communication interface 824. These signals 828 are provided to communication interface 824 via a communication path 826. Communication path 826 carries signals 828 and may be implemented using wire or cable, fiber optics, a phone line, a cellular phone link, a radio frequency link, or any other suitable communication channel. For instance, communication path 826 may be implemented using a combination of channels.

In this document, the terms "computer program medium" and "computer usable medium" are used generally to refer to media such as removable storage unit 818, a hard disk installed in hard disk drive 812, and signals 828. These computer program products are means for providing software to computer system 800.

Computer programs (also called computer control logic) are stored in main memory 808 and/or secondary memory 810. Computer programs may also be received via communication interface 824. Such computer programs, when executed, enable computer system 800 to implement the present invention as discussed herein. Accordingly, such computer programs represent controllers of computer system 800. Where the invention is implemented using software, the software may be stored in a computer program product and loaded into computer system 800 using removable storage drive 814, hard disk drive 812, or communication interface 824, to provide some examples.

In alternative embodiments, the invention can be implemented as control logic in hardware, firmware, or software or any combination thereof.

The embodiments above are described by way of example, and are not intended to limit the scope of the invention. Various alternatives may be envisaged which nevertheless fall within the scope of the claims.

7.0 Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described example embodiments, but should be defined only in accordance with the following claims and their equivalents.

What is claimed is:

1. A computer implemented method for predicting a weather-based financial index value, comprising:
   predicting, with a processor, a plurality of future financial components based on a respective plurality of historical financial components;
   predicting, with the processor, a value of a future weather factor based on a value of a historical weather factor;
   multiplying, with the processor, each of the plurality of future financial components by a corresponding weighting factor based on a future stocks-to-use ratio, thereby generating a plurality of weighted future financial components;
   combining, with the processor, the plurality of weighted future financial components, thereby generating a combination of future components; and
   dividing, with the processor, the combination of future components by the value of the future weather factor, thereby predicting the weather-based financial index value.

2. The method of claim 1, wherein the corresponding weighting factor further includes at least one of a supply variable and a demand variable.

3. The method of claim 1, wherein each corresponding weighting factor has a common unit of measurement with other corresponding weighting factors.

4. The method of claim 1, wherein each corresponding weighting factor corresponds to a respective geography.

5. The method of claim 1, wherein each corresponding weighting factor is based on an economic indicator.

6. The method of claim 1, wherein each corresponding weighting factor is based on population.

7. The method of claim 1, wherein the future financial components include a price of at least one of crude oil, natural gas, heating oil, and gasoline.

8. The method of claim 1, wherein the future financial components include a price of electricity.

9. The method of claim 1, wherein the future financial components include a value of at least one of an equity instrument, an income instrument, and an insurance variable.

10. The method of claim 1, wherein the future weather factor is based on a temperature.

11. The method of claim 1, wherein the future weather factor is based on precipitation.

12. The method of claim 1, wherein the future weather factor is based on storm activity.

13. The method of claim 1, wherein the future weather factor is based on two or more weather variables.

14. The method of claim 1, wherein the future financial components represent commodities.

15. The method of claim 1, wherein the future financial components represent equity instruments.

16. The method of claim 1, wherein the future financial components represent same-store-sales values of respective equities.

17. The method of claim 1, wherein the future financial components represent rate-of-change values of respective equities.

18. The method of claim 1, wherein the future financial components represent dividends paid per period for respective equities.

19. The method of claim 1, wherein at least one future financial component is based on an economic indicator.

20. The method of claim 1, wherein the future financial components represent income instruments.

21. A computer readable medium embodied with programmable code, said code when executed, causing a processor to predict a weather-based financial index value, the computer readable medium comprising:
   a first module that causes the processor to predict a plurality of future financial components based on a respective plurality of historical financial components;
   a second module that causes the processor to predict a value of a future weather factor based on a value of a historical weather factor;
   a third module that causes the processor to multiply each of the plurality of future financial components by a corresponding weighting factor based on a future stocks-to-use ratio, thereby generating a plurality of weighted future financial components;
   a fourth module that causes the processor to combine the plurality of weighted future financial components, thereby generating a combination of future components; and
   a fifth module that causes the processor to divide the combination of future components by the value of the future weather factor, thereby predicting the weather-based financial index value.

22. The computer readable medium of claim 21, wherein the weighting factor further includes at least one of a supply variable and a demand variable.

23. The computer readable medium of claim 21, wherein each corresponding weighting factor has a common unit of measurement with other corresponding weighting factors.

24. The computer readable medium of claim 21, wherein each corresponding weighting factor corresponds to a respective geography.

25. The computer readable medium of claim 21, wherein each corresponding weighting factor is based on an economic indicator.

26. The computer readable medium of claim 21, wherein each corresponding weighting factor is based on population.

27. The computer readable medium of claim 21, wherein the future financial components include a price of at least one of crude oil, natural gas, heating oil, and gasoline.

28. The computer readable medium of claim 21, wherein the future financial components include a price of electricity.

29. The computer readable medium of claim 21, wherein the future financial components include a value of at least one of an equity instrument, an income instrument, and an insurance variable.

30. The computer readable medium of claim 21, wherein the future weather factor is based on a temperature.

31. The computer readable medium of claim 21, wherein the future weather factor is based on precipitation.

32. The computer readable medium of claim 21, wherein the future weather factor is based on storm activity.

33. The computer readable medium of claim 21, wherein the future weather factor is based on two or more weather variables.

34. The computer readable medium of claim 21, wherein the future financial components represent commodities.

35. The computer readable medium of claim 21, wherein the future financial components represent equity instruments.

36. The computer readable medium of claim 21, wherein the future financial components represent same-store-sales values of respective equities.

37. The computer readable medium of claim 21, wherein the future financial components represent rate-of-change values of respective equities.

38. The computer readable medium of claim 21, wherein the future financial components represent dividends paid per period for respective equities.

39. The computer readable medium of claim 21, wherein at least one future financial component is based on an economic indicator.

40. The computer readable medium of claim 21, wherein the future financial components represent income instruments.

41. A computer implemented method for predicting a weather-based financial index value, comprising:
    predicting, with a processor, a future financial component based on a historical financial component;
    predicting, with the processor, a value of a future weather factor based on a value of a historical weather factor;
    multiplying, with the processor, the future financial component by a weighting factor based on a future stocks-to-use ratio, thereby generating a weighted future financial component; and
    combining, with the processor, the weighted future financial component and the future weather factor value, thereby predicting the weather-based financial index value.

42. The method of claim 41, wherein the combining of the weighted future financial component and the future weather factor value includes dividing the weighted future financial component by the future weather factor value.

43. The method of claim 41, wherein the future weather factor is based on a predetermined geography.

44. The method of claim 41, wherein the predicted weather-based financial index value is based at least in part on population.

45. The method of claim 41, wherein the future financial component is based on a price of at least one of crude oil, natural gas, heating oil, and gasoline.

46. The method of claim 41, wherein the future financial component is based on a price of electricity.

47. The method of claim 41, wherein the future financial component is based on a value of at least one of an equity instrument, an income instrument, and an insurance variable.

48. The method of claim 41, wherein the future weather factor is based on a temperature.

49. The method of claim 41, wherein the future weather factor is based on precipitation.

50. The method of claim 41, wherein the future weather factor is based on storm activity.

51. The method of claim 41, wherein the future weather factor is based on two or more weather variables.

52. The method of claim 41, wherein the future financial component represents a commodity.

53. The method of claim 41, wherein the future financial component represents an equity instrument.

54. The method of claim 41, wherein the future financial component represents a same-store-sales value of an equity.

55. The method of claim 41, wherein the future financial component represents a rate-of-change value of an equity.

56. The method of claim 41, wherein the future financial component represents dividends paid per period for an equity.

57. The method of claim 41, wherein the predicted weather-based financial index value is based on an economic indicator.

58. The method of claim 41, wherein the future financial component represents an income instrument.

* * * * *